United States Patent
Longenecker et al.

(10) Patent No.: US 12,233,759 B2
(45) Date of Patent: Feb. 25, 2025

(54) ROTATABLE CAR SEAT WITH DETACHABLE SEAT AND TOP ANCHOR

(71) Applicant: ARTSANA USA, INC., Lancaster, PA (US)

(72) Inventors: Michael L. Longenecker, Lancaster, PA (US); Michael S. Degrace, Red Lion, PA (US); Matthew J. Ransil, Richland, PA (US)

(73) Assignee: Artsana USA, Inc., Lancaster, PA (US)

( * ) Notice: Subject to any disclaimer, the term of this patent is extended or adjusted under 35 U.S.C. 154(b) by 293 days.

(21) Appl. No.: 17/954,637

(22) Filed: Sep. 28, 2022

(65) Prior Publication Data

US 2023/0014310 A1    Jan. 19, 2023

Related U.S. Application Data

(63) Continuation-in-part of application No. 17/169,128, filed on Feb. 5, 2021, now Pat. No. 11,584,267.

(60) Provisional application No. 62/970,318, filed on Feb. 5, 2020.

(51) Int. Cl.
*B60N 2/28*    (2006.01)

(52) U.S. Cl.
CPC ......... *B60N 2/2869* (2013.01); *B60N 2/2806* (2013.01); *B60N 2/2821* (2013.01)

(58) Field of Classification Search
CPC ............................. B60N 2/2869; B60N 2/2821
See application file for complete search history.

(56) References Cited

U.S. PATENT DOCUMENTS

| | | | |
|---|---|---|---|
| 4,762,364 A | 8/1988 | Young | |
| 4,971,392 A | 11/1990 | Young | |
| 6,196,629 B1 | 3/2001 | Onishi et al. | |
| 6,241,314 B1 | 6/2001 | Pufall | |
| 6,431,647 B2 | 8/2002 | Yamazaki | |
| 6,508,510 B2 | 1/2003 | Yamazaki | |
| 6,938,954 B1 | 9/2005 | Hendren et al. | |

(Continued)

FOREIGN PATENT DOCUMENTS

| | | |
|---|---|---|
| EP | 1344678 A2 | 9/2003 |
| EP | 1625968 A1 | 2/2006 |

(Continued)

*Primary Examiner* — David R Dunn
*Assistant Examiner* — Tania Abraham
(74) *Attorney, Agent, or Firm* — Saxton & Stump, LLC

(57) ABSTRACT

A child safety seat for use in a vehicle, the safety seat having a base including a rotating mechanism and a seat shell for a child that is detachably connectable to the base. The base is anchorable in the vehicle using either conventional safety belts or LATCH anchoring provisions. The base is configured to allow a conventional three-point occupant restraint to secure the base to the vehicle and to prevent interaction between the seat shell and the restraint belt. The seat shell, when connected to the base, may be rotated about a generally upstanding axis into forward-facing, rearward-facing, or side-facing configurations. The base includes a moveable wedge that allows the base to optimally fit a variety of vehicle seat having different seat cushion inclinations. The seat shell also includes a height-adjustable backrest portion that allows the seat configuration to be optimized for the occupant, even as the occupant child grows.

11 Claims, 29 Drawing Sheets

(56) References Cited

U.S. PATENT DOCUMENTS

| | | |
|---|---|---|
| 7,073,859 B1 | 7/2006 | Wilson |
| 7,232,185 B2 | 6/2007 | Hartenstine et al. |
| 7,338,122 B2 | 3/2008 | Hei et al. |
| 7,357,451 B2 | 4/2008 | Bendure et al. |
| 7,478,877 B2 | 1/2009 | Lhomme et al. |
| 7,490,897 B2 | 2/2009 | Lhomme et al. |
| 7,575,276 B1 | 8/2009 | Henry |
| 7,712,830 B2 | 5/2010 | Lhomme et al. |
| 7,753,444 B2 | 7/2010 | Vallentin |
| 7,887,129 B2 | 2/2011 | Hei et al. |
| 7,988,230 B2 | 8/2011 | Heisey et al. |
| 8,955,915 B2 | 2/2015 | Mason et al. |
| 9,016,782 B2 | 4/2015 | Xu |
| 9,090,182 B2 * | 7/2015 | Rabeony .............. B60N 2/2863 |
| 9,114,739 B2 | 8/2015 | Conway |
| 9,346,377 B2 | 5/2016 | Xu |
| 9,365,135 B2 | 6/2016 | Carpenter |
| 9,415,707 B2 | 8/2016 | Böhm |
| 9,434,279 B2 | 9/2016 | Williams |
| 9,499,074 B2 | 11/2016 | Strong et al. |
| 10,189,381 B2 | 1/2019 | Williams et al. |
| 10,322,651 B2 | 6/2019 | Hutchinson et al. |
| 10,336,219 B2 | 7/2019 | Mason et al. |
| 10,449,876 B2 | 10/2019 | Lonstein et al. |
| 10,457,168 B2 | 10/2019 | Anderson et al. |
| 2001/0004162 A1 | 6/2001 | Yamazaki |
| 2002/0163232 A1 * | 11/2002 | Vezinet ................ B60N 2/2845 |
| | | 297/183.2 |
| 2004/0070246 A1 | 4/2004 | Adachi |
| 2008/0224516 A1 | 9/2008 | Vegt |
| 2015/0336481 A1 | 11/2015 | Horsfall |
| 2017/0355287 A1 | 12/2017 | Anderson |
| 2018/0264977 A1 | 9/2018 | Anderson et al. |
| 2019/0077282 A1 | 3/2019 | Reaves et al. |

FOREIGN PATENT DOCUMENTS

| | | | |
|---|---|---|---|
| EP | 3144178 A1 * | 3/2017 | ............... A47C 3/18 |
| GB | 2207043 A | 1/1989 | |
| GB | 2288328 A * | 10/1995 | ........... B60N 2/2854 |
| GB | 2297479 A | 8/1996 | |
| GB | 2425463 B | 11/2006 | |
| KR | 20090044672 A | 5/2009 | |
| WO | 2015027275 A1 | 3/2015 | |
| WO | 2019053102 A1 | 3/2019 | |
| WO | 2020015599 A1 | 1/2020 | |

* cited by examiner

ROTATABLE CAR SEAT WITH DETACHABLE SEAT AND TOP ANCHOR

CROSS REFERENCE TO RELATED APPLICATIONS

This application is a continuation in part application of U.S. patent application Ser. No. 17/169,128, filed Feb. 5, 2021.

BACKGROUND OF THE INVENTION

The present invention relates to child restraints adapted to be anchored to a vehicle seat to transport a child in the vehicle, and more particularly, the to a child restraining seat including a swiveling seat portion, that is easily installable into a vehicle.

Safety seats in vehicles for children (car seats) are well-known in the art. Car seats are removable units that are secured to a selected passenger seat of a vehicle. Car seats are specially designed for the smaller weight and size of a child, as compared to standard vehicle seats, which are designed to accommodate large youths and adults. Most states have statutes requiring that children below certain age and/or weight limits be positioned in a rear-facing seat. Once the child reaches a certain weight and age a front-facing car seat may be used.

Prior-art car seats are designed to secure a child and limit movement of the child which can make it difficult to move the child into or from such the seat. Car seats typically includes partially raised sides and a five-point seatbelt harness to secure the child to the car seat. The raised sides of a forward-facing seat, however, make it necessary for an adult that is assisting the child into the seat to lift the child over a side of the seat and then place the child in the seat. Due to the confined space in most passenger vehicles, the adult must remain outside the vehicle when lifting the child and installing the five-point harness, causing the adult to bend and lean or reach into the vehicle. The same demands on the adult are required to remove the child from the car seat.

Car seats used in front-facing orientations are required to be reinforced to withstand additional forces larger occupants place on the restraint harness during vehicle crashes. Some car seats are secured by attachments points near the seat base secured to LATCH anchors in the vehicle seat and a tether connected higher on the car seat back attached to a tether anchor, typically positioned near the top of the vehicle seat back. Other car seats may eschew the tether and require additional structural reinforcement between the base and back to withstand crash loads imparted to the seat back through the child shoulder restraints.

A need exists for a car seat that allows a child to be placed into and removed from a car seat without the need for an assisting adult to substantially lean inside the vehicle, or to lift the child over a raised side of the car seat. A swiveling car seat provides such an apparatus, selectively swiveling between a forward-facing position and a side or door-facing position to enable a child to enter and/or exit the seat. Benefits are provided by a swiveling car seat that may be swiveled between a forward-facing orientation, a side-facing orientation, and a rear-facing orientation. Additional advantages would be realized by a swiveling car seat that may be positioned to a side-facing orientation in either direction to allow seat installation on either side of a vehicle. Still further advantages would be realized by a swiveling car seat in which the seat shell is removeable.

To provide a swiveling car seat capable of forward-facing use and able to withstand crash loads from larger occupants, the swiveling car seat should incorporate a means to reinforce the swiveling portion and allow the seat back to be anchored to an upper tether mount of a three-point occupant restraint in the vehicle so that the functional features may be provided in a design that meets applicable safety standards.

SUMMARY OF THE INVENTION

Accordingly, the present invention, in any of the embodiments described herein, may provide one or more of the following advantages:

It is an object of the present invention to provide a child safety seat for use in a vehicle, the safety seat having a base including a rotating mechanism and a seat shell for a child that is detachably connectable to the base. The base is anchorable in the vehicle using either conventional safety belts or LATCH anchoring provisions. The seat shell, when connected to the base, may be rotated about a generally upstanding axis into forward-facing, rearward-facing, or side-facing configurations.

It is a further object of the present invention to provide a child safety seat for use in a vehicle, the seat having a seat shell that is rotatable relative to the base, the base being secured to the vehicle using both lap portion and shoulder portion of the vehicle safety belts to retain the base to the vehicle and a connection between the seat shell and the base disposed adjacent to the upper backrest portion of the seat shell, the combination enabling the seat to be used with a wider size range of children. The seat shell includes a backrest portion extending upwardly from a seating portion, the backrest portion including a retention member engageable with the base at a position adjacent to the upper backrest portion of the shell, the base connection with the shoulder portion of the vehicle safety belt reinforcing the connection with the vehicle when the seat shell is in the forward-facing configuration. The engagement of the backrest portion of the seat shell with the shoulder belt reinforces the structure to which the child is secured and increases the rated weight limits for children to be restrained by the safety seat.

It is a further object of the present invention to provide a child safety seat for use in a vehicle having a based that is removably securable in a vehicle and a seat shell removably connectable to the base. The seat shell may be swiveled about a generally upstanding axis and locked into forward-facing or rearward-facing positions. The seat shell may also be swiveled to side-facing positions to improve access to the child when placing or removing the child from the safety seat. The seat shell may be easily detached from the base. A release mechanism easily operable by a user allows, when operated, the shell to be lifted from the base.

It is a still further object of the present invention to provide a child safety seat that is configurable to suit children of wide-ranging sizes. The swiveling seat shell permits the safety seat to be configured for rearward-facing use as is preferred for infants and forward-facing for larger children. The seat shell is also provided with an adjustable backrest with a convenient headrest height-adjusting mechanism. The height adjustment mechanism includes a moveable roll for the child shoulder harness to manage adjustment of the shoulder harness as the head rest is adjusted between varying heights.

It is a still further object of the present invention to provide a child safety seat having a base that may be secured in a vehicle using a three-point safety belt or LATCH connectors normally available in the vehicle and a seat portion removably attached to the base, the seat portion capable of swiveling in relation to a base allowing forward-facing, rearward-facing, and side facing configurations for use in a vehicle that is durable in construction, inexpensive of manufacture, carefree of maintenance, easily assembled, and simple and effective to use.

These and other objects are achieved in accordance with the present invention by providing a child safety seat for use in a vehicle, the safety seat having a base including a rotating mechanism and a seat shell for a child that is detachably connectable to the base. The base is anchorable in the vehicle using either conventional safety belts or LATCH anchoring provisions. The base is configured to allow a conventional three-point occupant restraint to secure the base to the vehicle and to prevent interaction between the seat shell and the restraint belt. The seat shell, when connected to the base, may be rotated about a generally upstanding axis into forward-facing, rearward-facing, or side-facing configurations. The base includes a moveable wedge that allows the base to optimally fit a variety of vehicle seat having different seat cushion inclinations. The seat shell also includes a height-adjustable backrest portion that allows the seat configuration to be optimized for the occupant, even as the occupant child grows.

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

Figure 1:
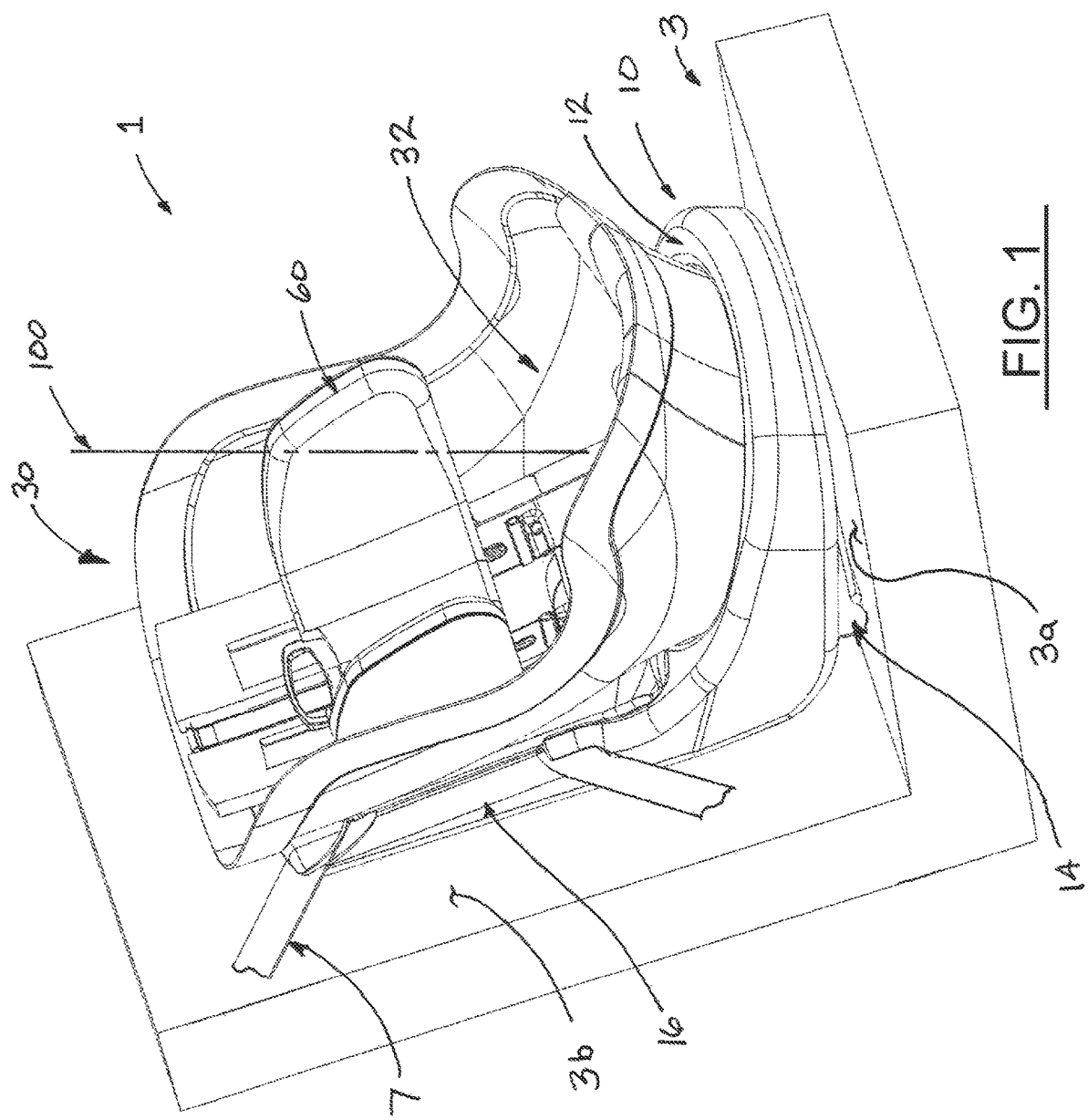
FIG. 1 is a perspective view of one embodiment of the present child safety seat invention as it would be installed in a vehicle wherein the child seat orients the occupant in a forward-facing position.

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "up" or "down," or "top" or "bottom" are used as a matter of mere convenience and are determined as the seat would normally be positioned on a surface or vehicle seat. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all figures.

Referring to the figures, a child safety seat 1 embodying the present inventions comprises a base assembly 10 configured to be positioned and secured on the seating surface 3a of a vehicle seat 3 using the seat belt 7 installed in the vehicle. Alternatively, the base assembly 10 may be secured to the vehicle seat using Lower Anchors and Tethers for Children (LATCH) provisions that may be present in the vehicle. The base assembly 10 includes a base portion 12 for positioning in the vehicle to support the seat shell 30 of the child safety seat. A backrest portion 16 extends upwardly from the base portion 12 and, when installed in a vehicle seat 3, is in adjacent contact with the backrest surface 3b of the vehicle seat. The base portion 12 further includes a wedge adjuster 14 which allows the base assembly 10 to be configured to securely fit into a variety of vehicle seats of different inclinations of the seating surface 3a to assure simultaneous adjacent contact by the base assembly 10 with both the seating surface 3a and the backrest surface 3b.

The base assembly 10 may be secured to the vehicle seat 3 using the safety belt 7 typically installed in vehicles. The exemplar vehicle safety belt 7 is a three-point occupant restraint that crosses an occupant's lap and again across the occupant's chest. The base assembly 10 may also include provisions for connection with LATCH anchors typically available in passenger vehicles.

Figure 2:
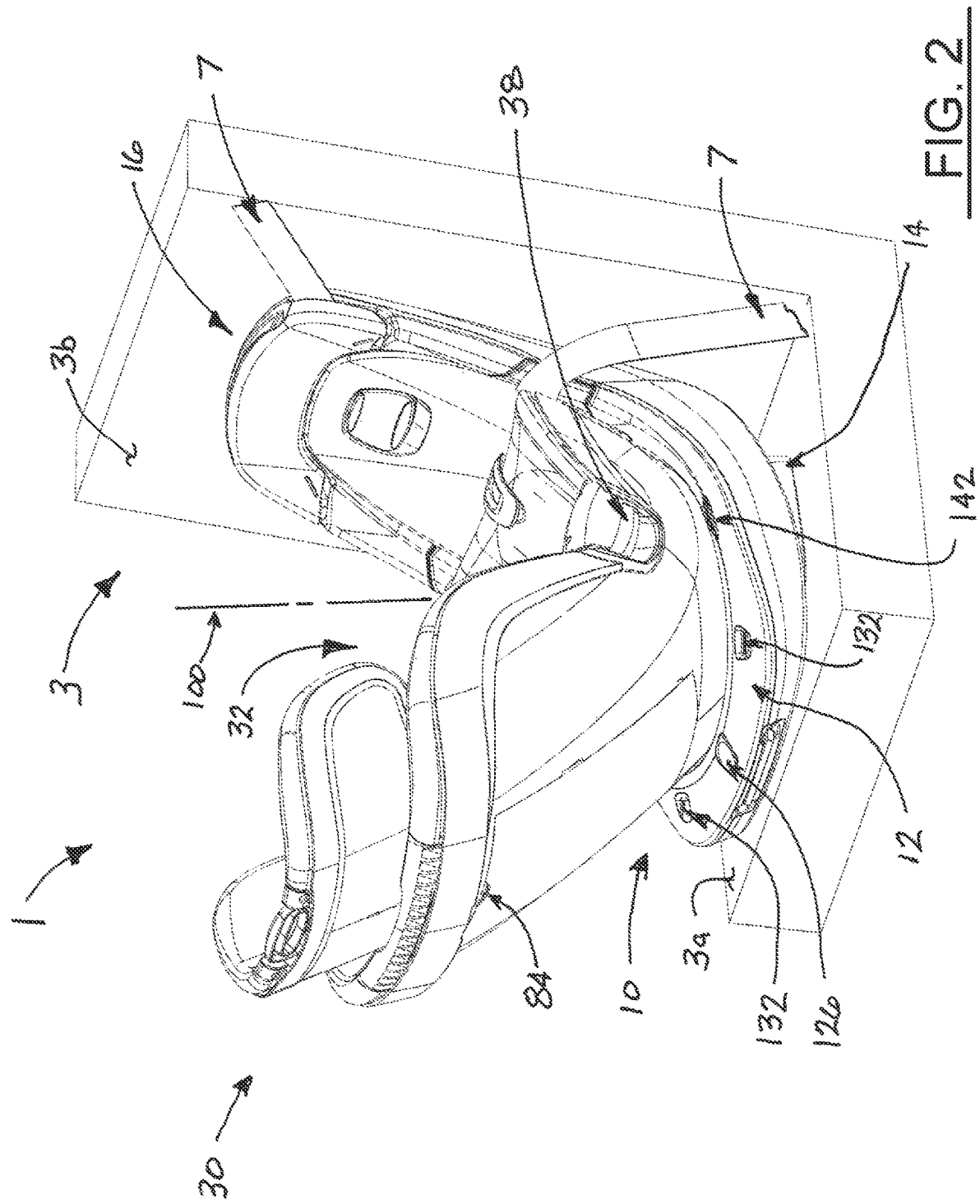
FIG. 2 is a perspective view of the child safety seat of FIG. 1 wherein the child seat orients the occupant in a rearward facing position.
Figure 3:
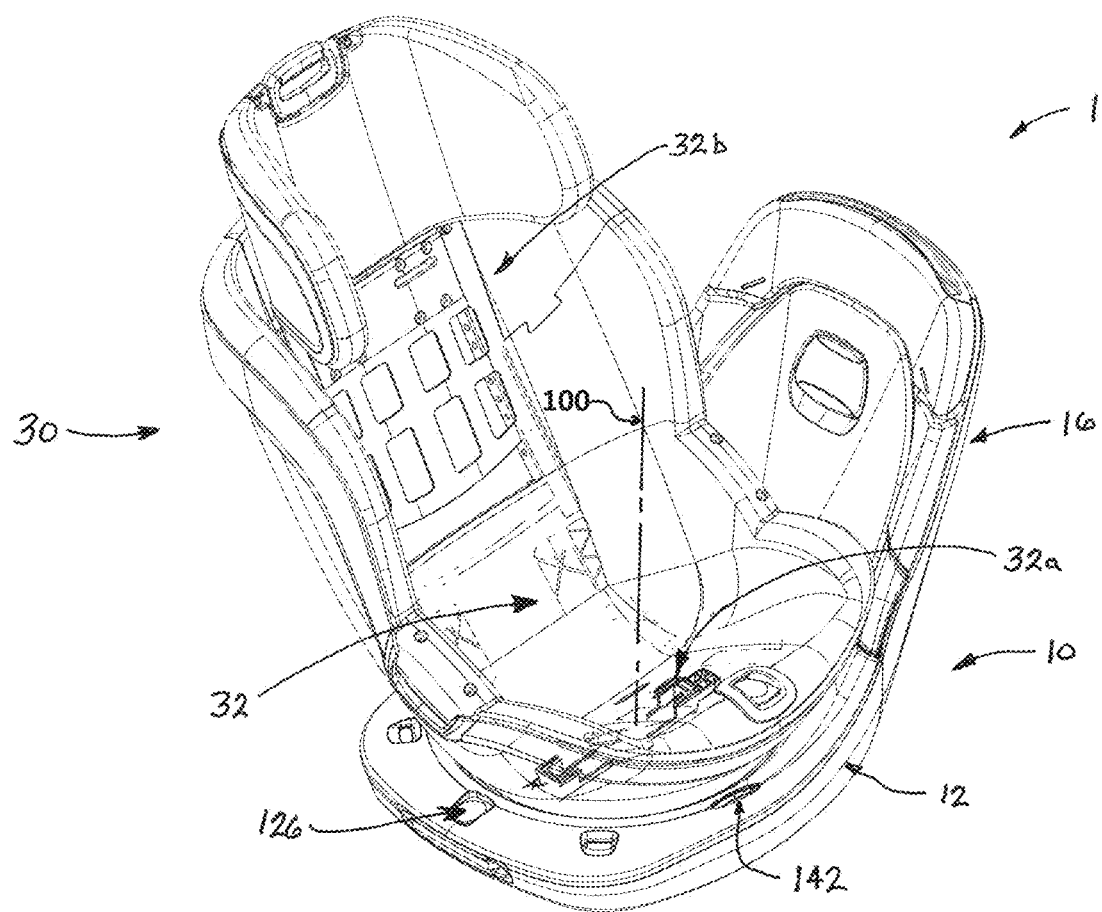
FIG. 3 is a perspective view of the child safety seat of FIG. 1 wherein the child seat is oriented side facing to improve access to the occupant for positioning in or removing from the seat.
Figure 4:
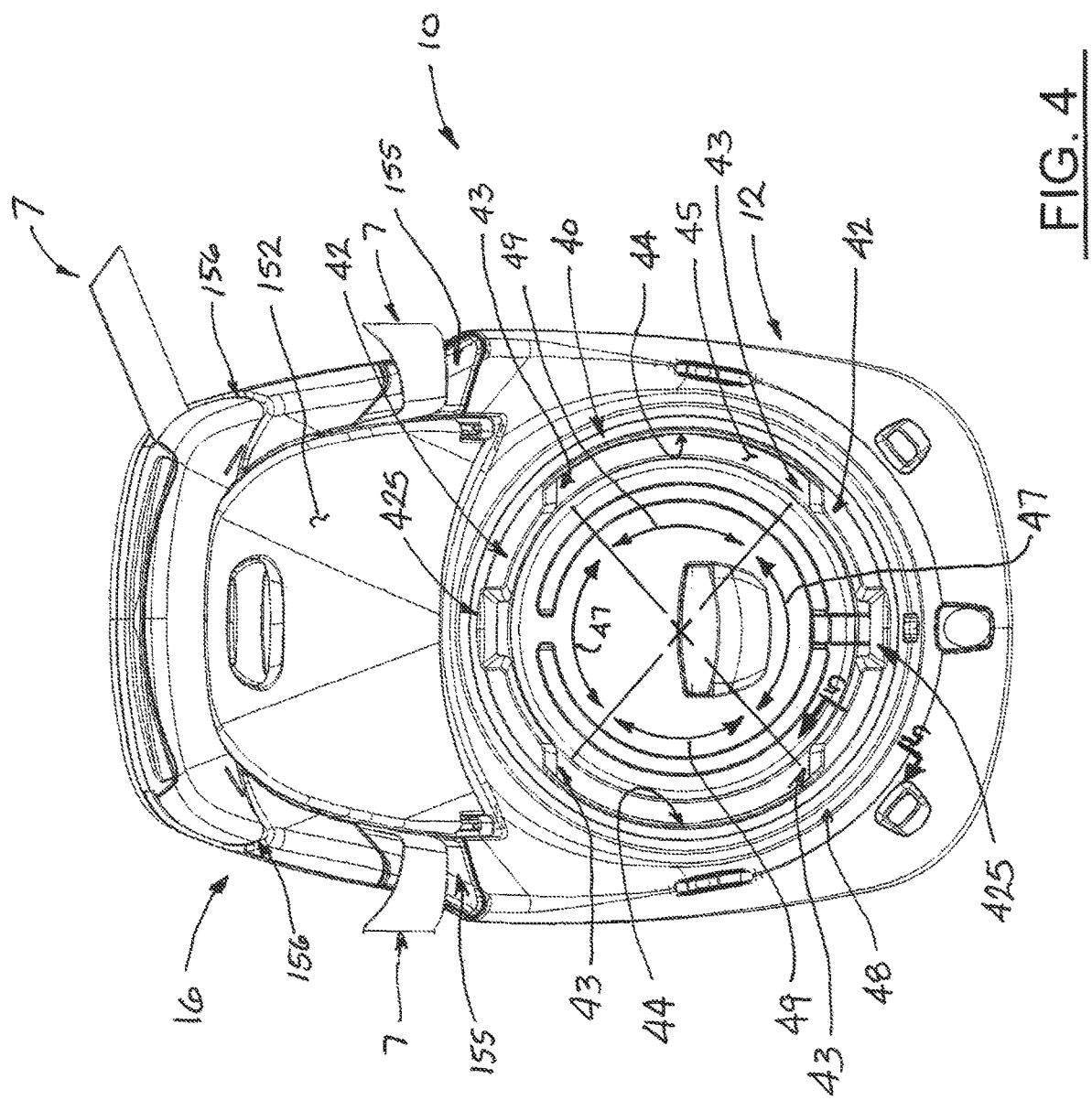
FIG. 4 is a plan view of the base assembly detailing the connector interface.
Figure 5:
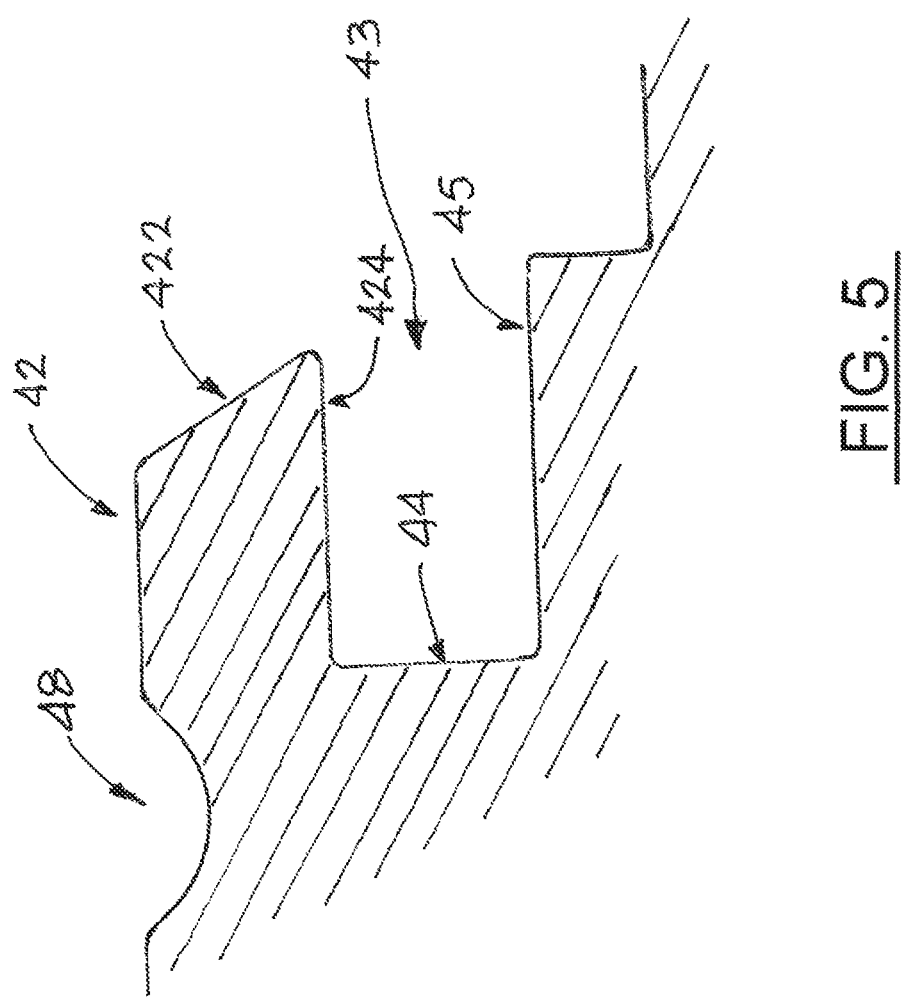
FIG. 5 is a section view of a portion of the base assembly connector interface shown in FIG. 4 viewed along cut line 5-5.
Figure 6:
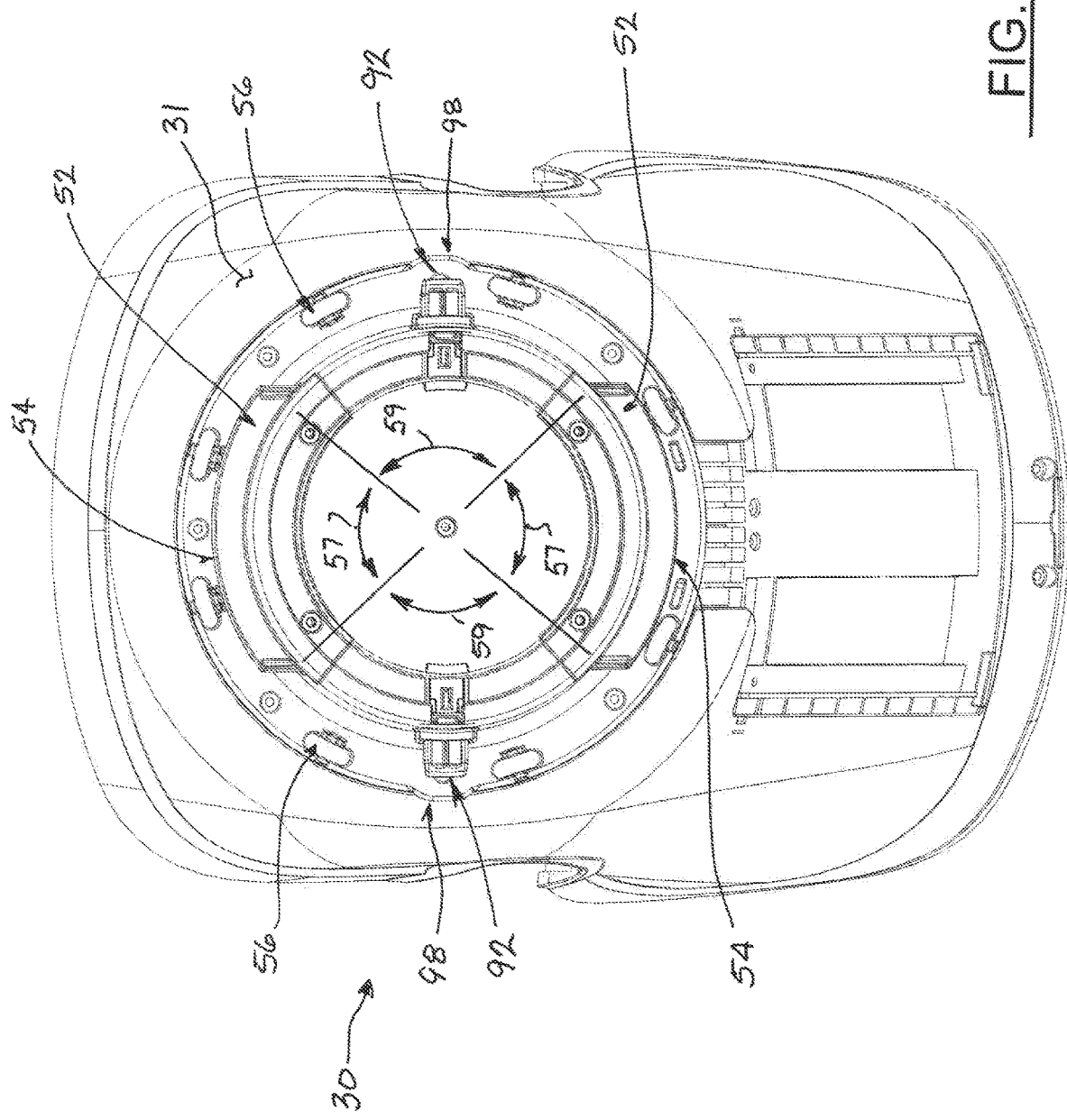
FIG. 6 is a bottom view of the connector interface on the lower surface of the seat shell.
Figure 7:
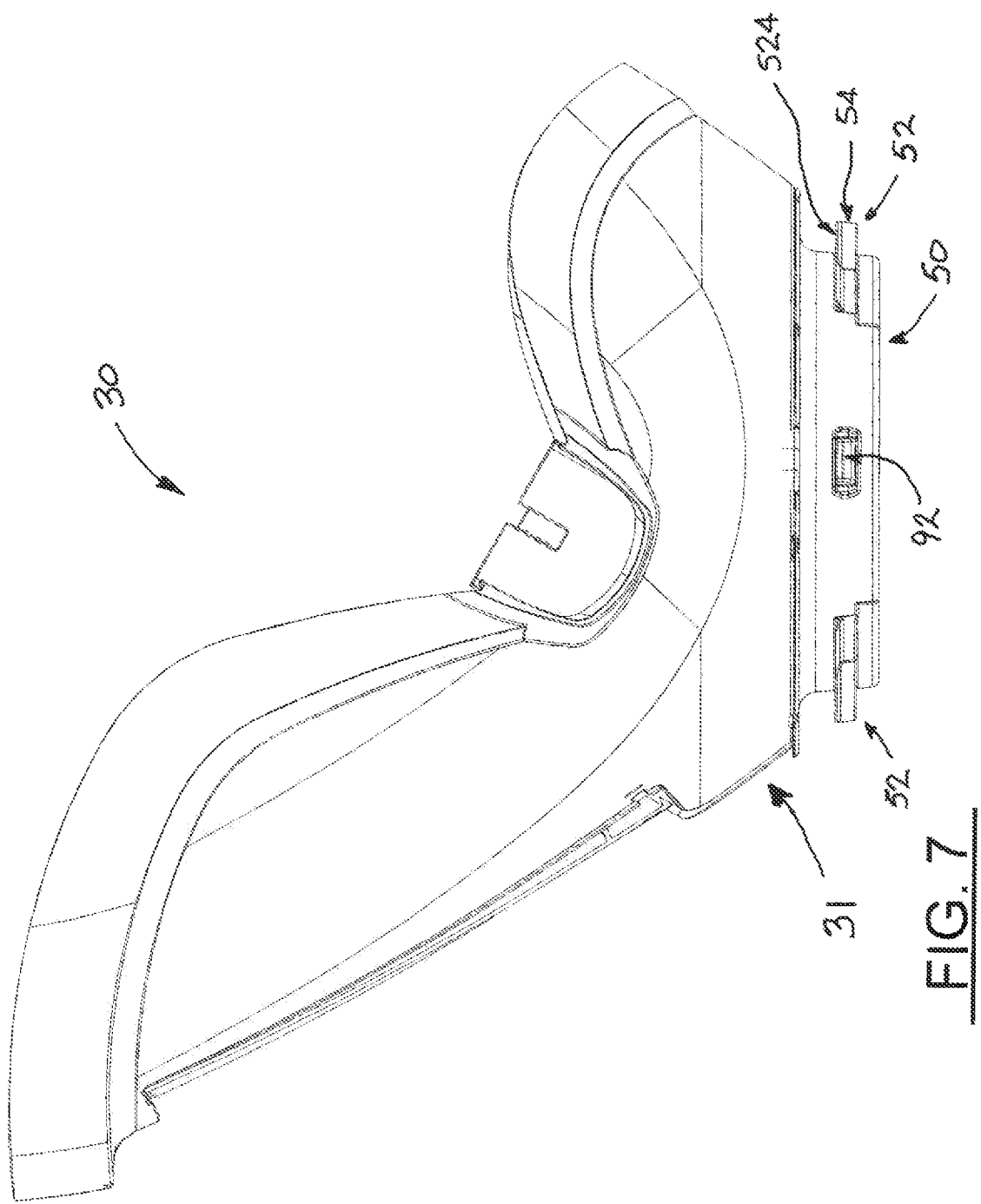
FIG. 7 is a side elevation view of the seat shell showing the configuration of the connector interface.
Figure 8:
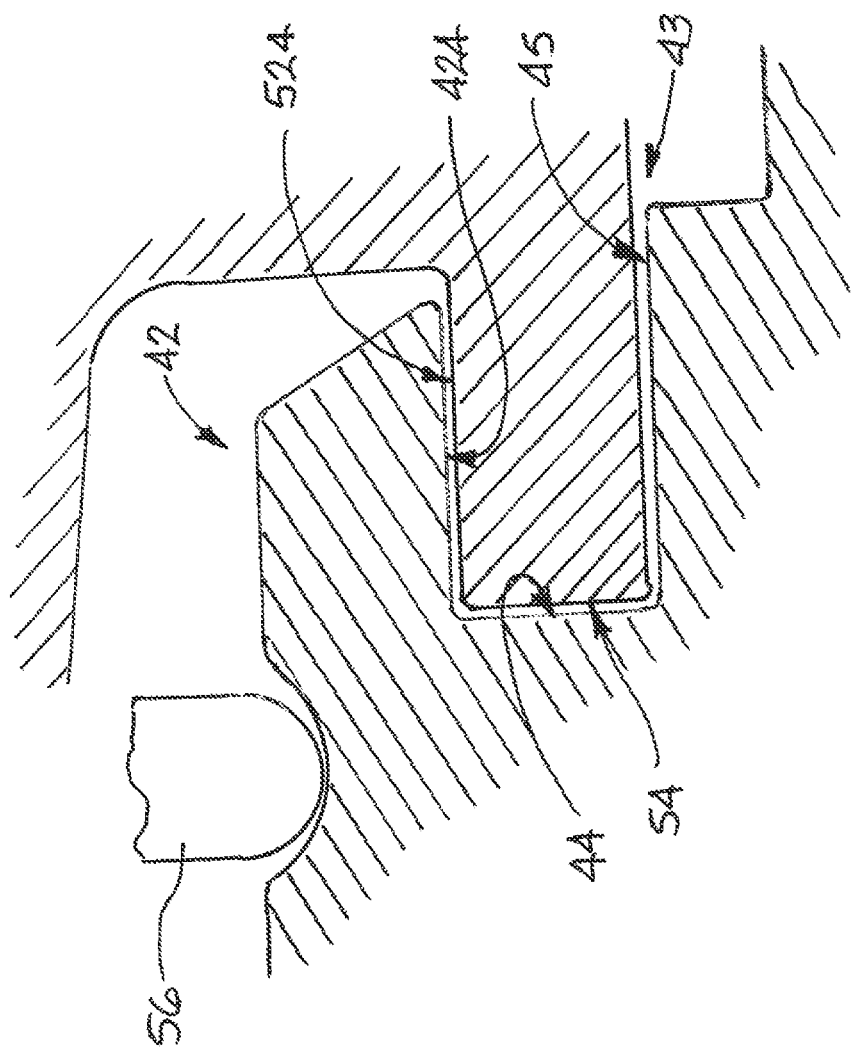
FIG. 8 is the partial section view of FIG. 5 showing a portion of the second retainer to illustrate the spatial relationship of the retainers in the connector interface when the seat shell is installed.

A seat shell 30 is moveably connected to the base assembly 10 and includes an interior space 32 defining a seating surface 32a and a backrest surface 32b configured to receive a child occupant. The connection between the base assembly 10 and the seat shell 30 enables the seat shell to be selectively positioned between a forward-facing orientation (FIG. 1) suitable for larger child occupants, a rearward-facing orientation (FIG. 2) suitable for infant occupants, and a side-facing orientation (FIG. 3) which improves access to the seat shell for positioning into or removing from the seat shell an occupant. The seat shell 30 may be oriented to face either side in the side-facing orientation to enable realization of the benefits of the safety seat when installed on either side of a vehicle.

In a first aspect of the invention, a connector 20 is provided to selectively attach the seat shell 30 to the base assembly 10 in a manner allowing the seat shell to swivel 360 degrees about a generally upstanding rotational axis 100. The connection also allows the seat shell 30 to be fixedly aligned in one or more predetermined orientations, including at least forward-facing and rearward-facing orientations of the seat shell. The connector 20 also allows the seat shell 30 to selectively be detached from the base assembly 10. The seat shell is detached from the base by positioning the shell in one of the two side facing orientations and actuating a release mechanism to permit the shell to be lifted in the direction of the rotational axis 100 and separated from the base when in such orientation.

Referring specifically to FIGS. 4 through 8, the connector 20 comprises a generally circular first interface portion 40 in the base assembly 10. The first interface portion may comprise a pair of first retainers 42 and a first lateral guide 44 symmetrically arranged about the rotational axis 100. The first lateral guide 44 is defined by an upstanding wall circularly arranged and upwardly projecting from a floor surface 45. The first retainers 42 project inwardly from the first lateral guide 44 encircling an upwardly open area for receiving a second interface portion 50 of the connector. The first retainers 42 include a first vertical bearing surface 424 which is generally parallel to and spaced apart from the floor surface 45 forming a generally C-shaped, inwardly open base channel 43 therebetween that extends partially around the periphery of the first lateral guide 44. The first retainers 42 may also include an inwardly sloped upward facing surface 422 to aid guidance of the seat shell into the connector 20. The first retainers 42 may be symmetrically arranged arcuately about a portion of the first lateral guide surface 44. In the preferred exemplar embodiment, two first retainers 42 are provided and symmetrically positioned about the circular perimeter, each spanning a first retainer sector 47. A pair of first gap sectors 49 is defined along the circular perimeter of the lateral guide between the first retainers 42. The first retainers do not inwardly extend in the region of the gap sectors and define gaps in the first retainers that extending outwardly to the lateral guide. The arcuate measure of the gap sectors preferably exceeds the arcuate measure of the first retainers.

Connector 20 also comprises a generally circular second interface portion 50 disposed on the lower exterior surface 31 of the seat shell 30 also symmetrically arranged about the rotational axis 100. The diameter of the second interface portion 50 is sized to enable it to nest within open receiving area of the first interface portion 40. The second interface portion 50 includes a pair of second retainers 52 that extend radially outwardly from a central portion of the second interface portion structure. Each of the second retainers 52 include a second lateral guide 54 and a second vertical bearing surface 524. Second retainers are symmetrically arranged about a portion of the periphery of the second connector interface 50, the second lateral guides 54 defining a circular perimeter having a diameter that is slightly less than that of the first lateral guide 44. When the seat shell 30 is engaged with the base 10, the second retainer 52 is positioned in the base channel 43 such that the second lateral guide 54 is positioned adjacent to and in sliding contact with the first lateral guide 44 in the base channel 43 in a manner which defines a rotational center for the seat shell coinciding with rotational axis 100. The first and second vertical bearing surfaces 424, 524 may also be in sliding contact dependent upon the rotational orientation of the seat shell 30. Small gaps between the lateral guides may exist within the defined sliding contact, but sufficient contact exists in the entirety of the interface to constrain the seat shell rotation to that generally about the rotational axis 100. In the exemplar embodiment, two second retainers 52 are provided and symmetrically positioned about the periphery of the second connector interface, each spanning a second retainer sector 57. A pair of second gap sectors 59 is defined along the circular perimeter of the lateral bearing portion between the second retainers 52. The arcuate measure of the second gap sectors is preferably greater than the measure of the second interface portions and the arcuate measure of the remaining second retainers must be less than the arcuate measure of the first gap sectors so that the remaining portions of the second retainers may pass through the first gap sectors when the second portion by axial movement of the second portion along rotational axis 100 when the respective retainers and gap sectors of the opposing interface portions are rotationally aligned, defined as a separation orientation.

The actual measure of first and second retainer sectors 47, 57 and first and second gap sectors 49, 59 may be varied provided that the measure of the gap sectors 49, 59 is greater than the measure of the retainer sectors 47, 57. The connector interfaces may also vary in the number of retainers and gap sectors provided the number of gap sectors equals or exceeds the number of retainers and the gap sectors are greater in measure than the retainer sectors. The symmetric pairs are preferred to permit two possible separation orientations of the seat shell for detachment from the base corresponding to a side-facing orientation of the seat shell in either direction.

The first and second retainers are structurally reinforced to withstand the forces created during vehicle crashes and retain the seat shell attached to the base. Surfaces in sliding contact such as first lateral bearing portion 44, second lateral guide 54, first vertical bearing surface 424, and second vertical bearing surface 524 may include a friction-reducing covering to improve quality of movement of the seat shell.

The relative locations of first and second interface portions 40, 50 of connector 20 may be reversed so that the first portion is disposed on the seat shell and the second portion is disposed on the seat base.

The connection of the seat shell 30 to the base assembly 10 is accomplished by orienting the seat shell 30 to a side facing orientation. In this configuration, the second retainers 52 are aligned with the arcuate gap sectors 49, 59 between the two first retainers 42 on the base assembly. The measure of the gap sectors 49, 59 is greater than the measure of the retainer sectors 47, 57 which assures that the second retainers 52 may move through the open space of the first gap sectors 47 and that the first retainers 42 may move through the open space of the second gap sectors 57 when the seat shell is properly aligned. The configuration allows the seat shell 30 to be lowered in relation to the base assembly 10, generally in the direction of rotational axis 100 until the first and second retainers 42, 52 are generally adjacent. Rotating the seat shell 30 engages the respective retainers 42, 52 in an overlapping arrangement that inhibits substantial upward movement of the shell and constrains the seat shell to rotational movement. By configuring the first and second retainers 42, 52 to span arcuate sectors that measure less than the open gap sectors 49, 59, the retainers 42, 52 may be disengaged by aligning the second retainers 52 on the shell 30 with the gap space 49 on the base assembly 10 which coincidentally aligns the first retainers 42 on the base with gap sectors 59 on the seat shell.

The generally circular configuration and the spatial configuration of the overlapping interface of the respective retainers and bearing surfaces preclude significant vertical displacement and limit relative motion between the seat shell and base to rotational when the seat shell is engaged with the base.

The base assembly 10 may further include a generally circular support track 48 positioned adjacent to the periphery of the first interface portion 40. The seat shell 30 may include a plurality of support wheels 56 circularly arranged so that the wheels engage the circular track 48 when the seat shell is connected to the base assembly. The support wheels 56 bear the weight of the seat and occupant and allow the seat shell 30 to be more easily swiveled (rotated) in relation to the base assembly and stabilize the connection. The circular track 48 may also be configured to constrain the movement of the support wheels 56 and further contribute to limiting motion of the seat shell to rotational. Alternative designs providing friction-reducing bearings and the like are contemplated in lieu of the support wheels.

Figure 9:
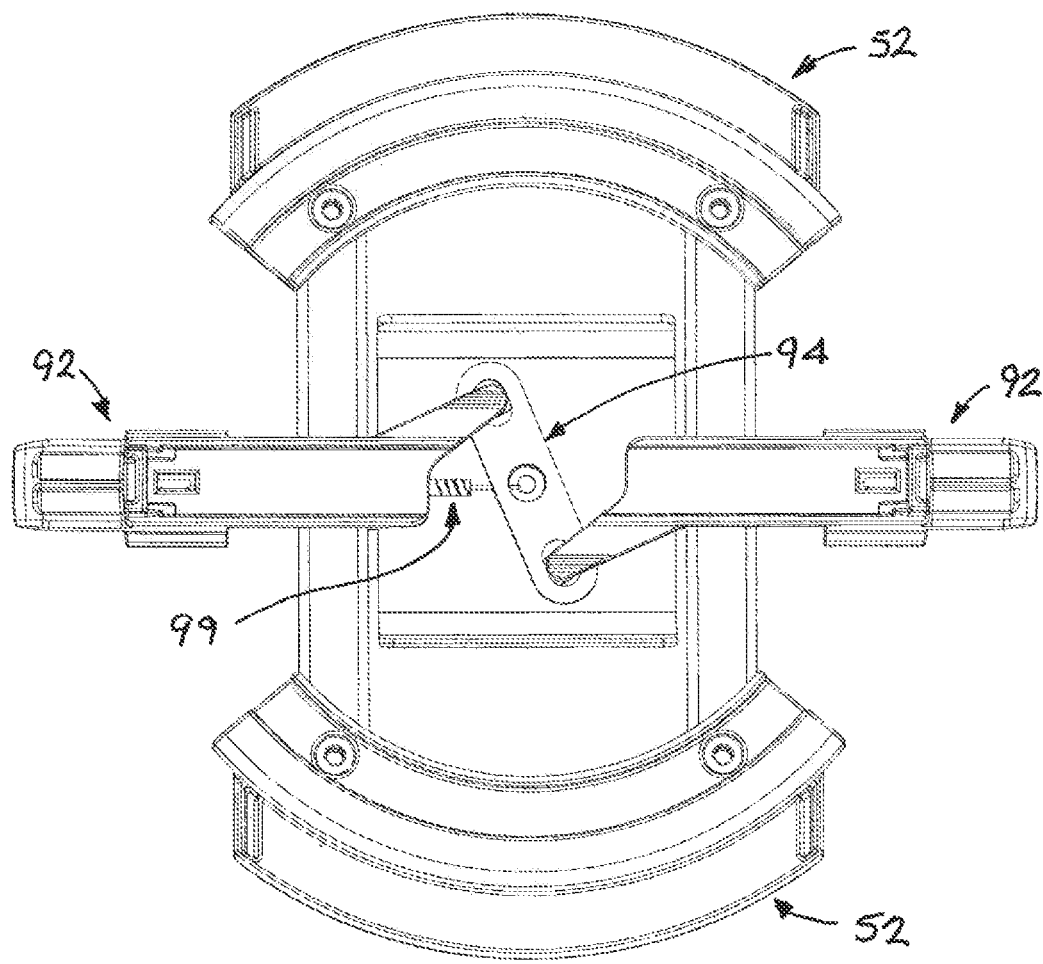
FIG. 9 is a partial view of the latching mechanism used to retain the seat shell attached to the base assembly viewed from beneath the seat shell.
Figure 10:
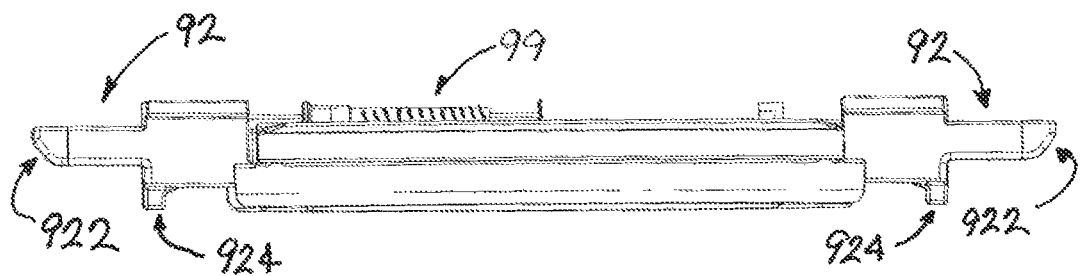
FIG. 10 is a partial elevation view of the latching mechanism shown in FIG. 9.
Figure 11:
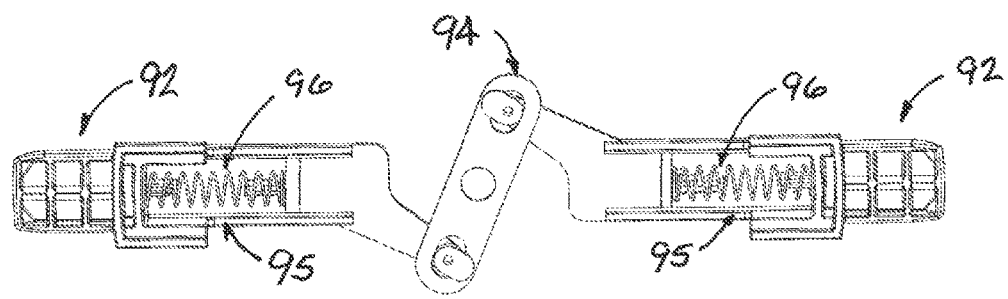
FIG. 11 is a partial reverse view of the latching mechanism of FIG. 9 illustrating the biasing means.
Figure 12:
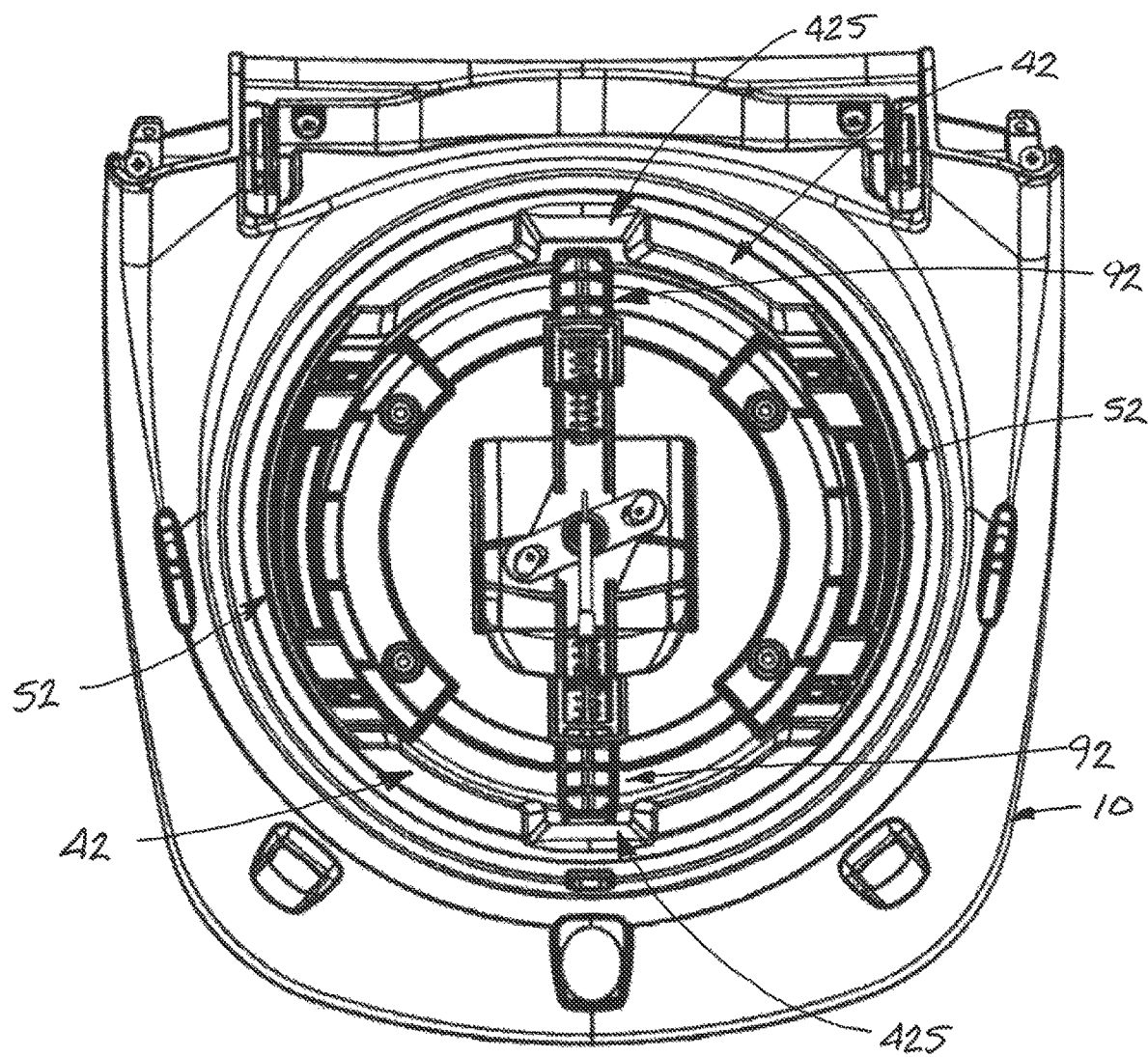
FIG. 12. shows the connector with the second connector interface and latching mechanism aligned for removal of the seat shell.

A latching mechanism 90 comprising a pair of moveable latch members 92 disposed in the second interface portion 50 of the seat shell 30 precludes inadvertent separation of the seat shell 30 from the base assembly 10 when operably attached. Movement of the latch members 92 is coordinated for simultaneous releasing movement along a latching axis 104 by a link member 94 (FIGS. 9-11) which is pivotally connected to the second interface portion 50; simultaneous movement of the latch members inwardly toward a release position is effected by selective user operation of a pull cable 99 or similar releasing actuator pivoting link member 94. The latch members may be slidably connected to arms 95 wherein one or more resilient members 96 may be used to bias the latch members 92 toward the outwardly displaced latched position to allow seat shell attachment to the base while minimizing movement of the latching mechanism release. Movement of the latch members 92 inwardly toward the release position is operably effected by a user operating one or both latch release handles 38 conveniently disposed on the seat shell and operably connected to the latching mechanism by a pull cable 99 or linkage.

Alternatively, the latching mechanism may be disposed on the base assembly and a releasing mechanism disposed either on the base assembly or on the seat shell to provide the same functionality.

The latch members 92 are preferably oriented laterally in relation to the seat shell. Each of the latch members 92 may include a tapered distal end 922. Each first retainer 42 in the base assembly 10 may include a notch-like guide structure 425 in the retainer which is configured to engage the latch members while allowing the latch members 92 to pass from above to below the first retainer 42 as the seat shell 30 is lowered onto the base assembly during seat shell attachment. The guide structures 425 are preferably disposed longitudinally in relation to the seat shell and base assembly so that the latch members 92 will be aligned therewith when the seat shell is in a side-facing orientation. The guide structure 425 and the distal ends 922 are tapered in a complimentary arrangement that reduces friction and reduces the inward displacement of the latch members necessary to permit them to pass beneath the first retainer 42 as the seat shell is lowered into attachment with the base assembly.

The latch members 92 also secure the seat shell rotationally to in either the forward- or rear-facing orientations. A pair of locking recesses 46 are provided in the first lateral guide 44 and are sized to receive the latch members 92 when outwardly displaced. The locking recesses 46 are positioned along transverse axis 103 so that the latch members are similarly aligned only when the seat shell 30 in in the either the forward- or rear-facing orientations. When so positioned, the latch members extend outwardly into the locking recesses 46 to prevent rotation of the seat shell 30 unless the latch release handles 38 are operated to withdraw the latch members.

Figure 13:
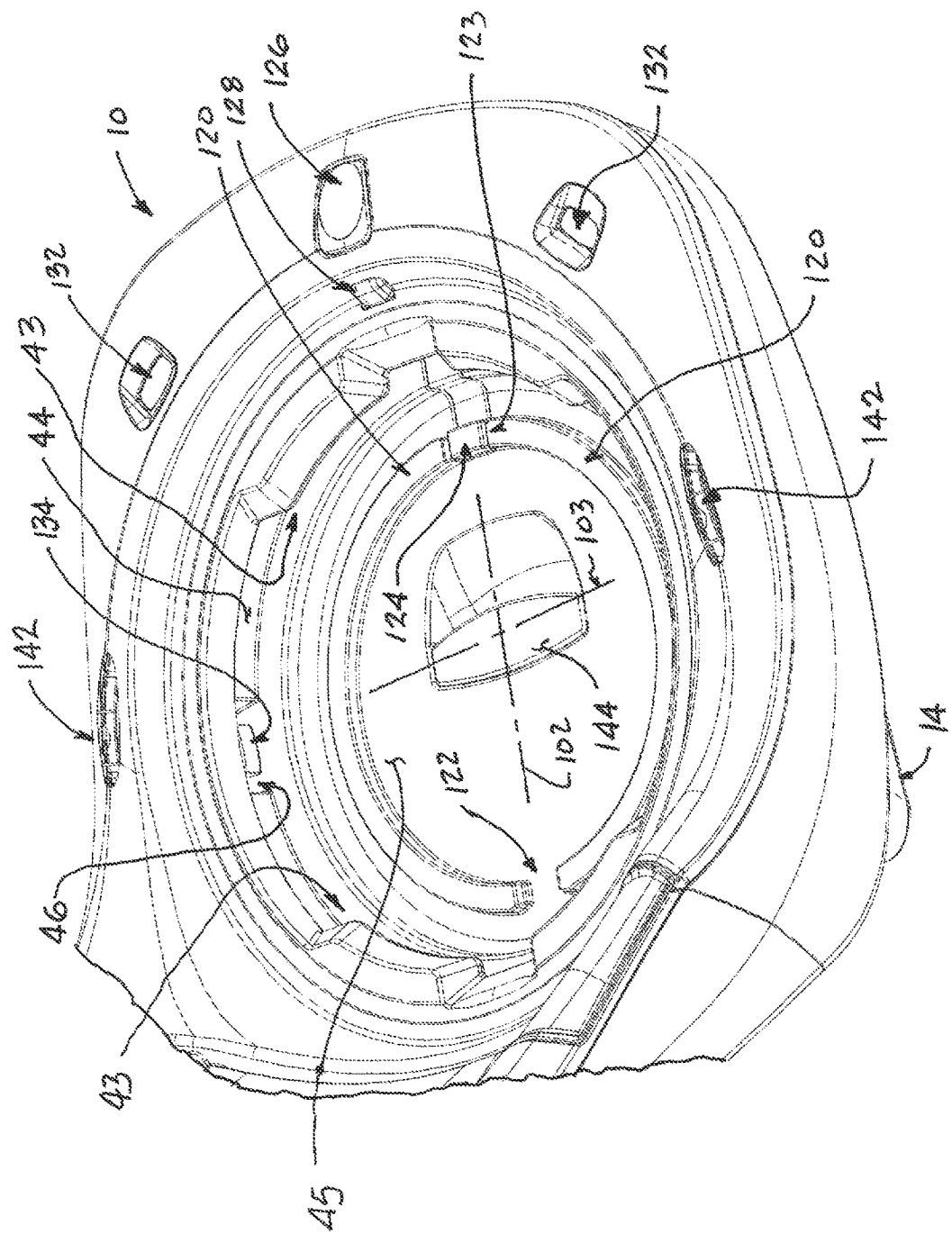
FIG. 13 is a partial perspective view of the base assembly detailing the blocking structure managing operation of the latching mechanism FIGS. 14 and 15 provide detail views of the blocking structure and the latching mechanism.
Figure 14:
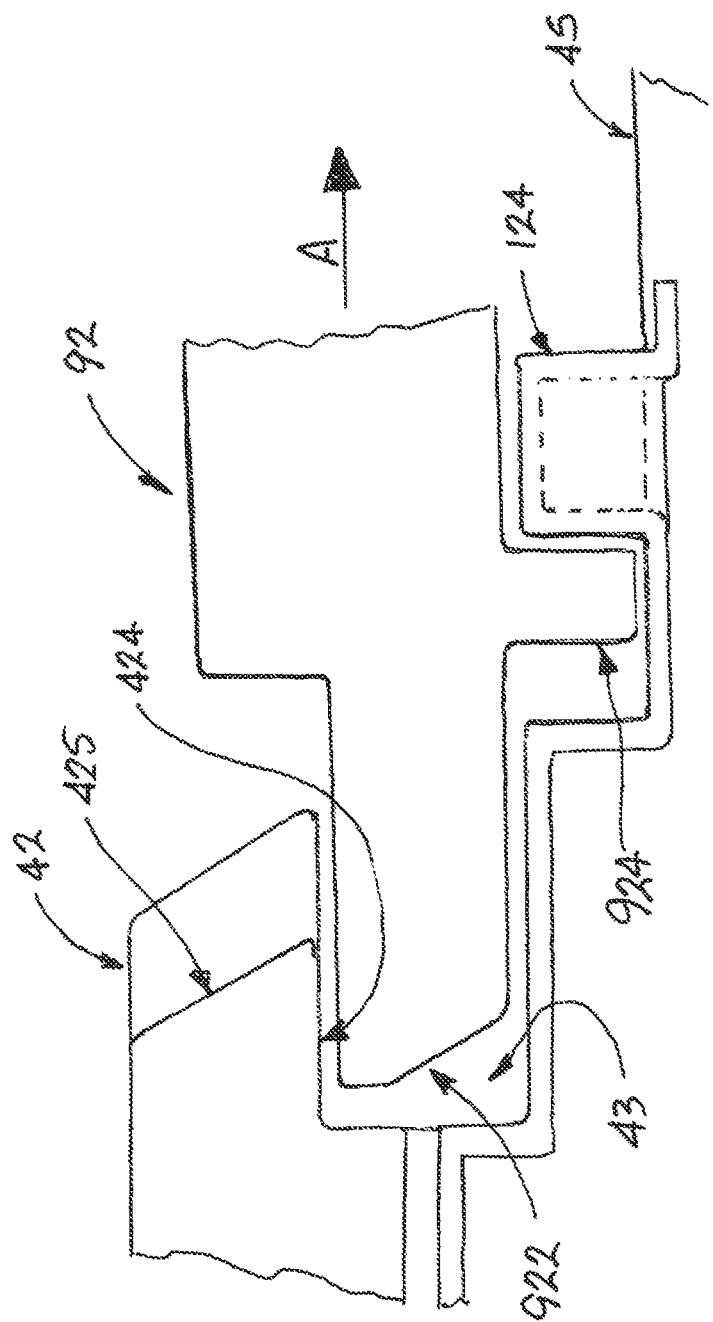
Figure 15:
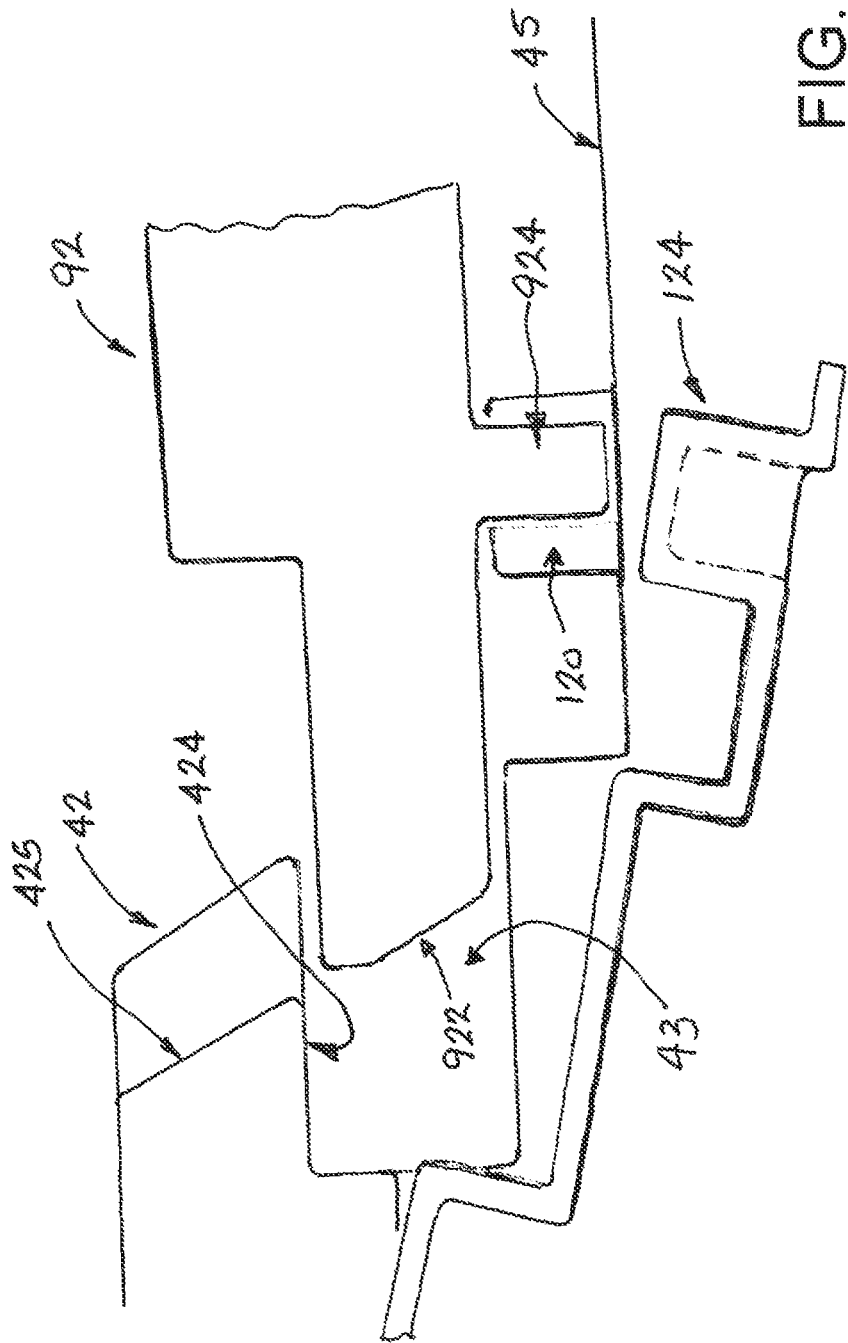

Inadvertent release of the latching mechanism 90 and thereby inadvertent separation of the seat shell 30 from the base assembly is prevented by a two-step releasing procedure. Referring to FIGS. 13 through 15, the base assembly includes a blocking structure 120 that projects upwardly from the floor surface 45 of the base assembly 10. The blocking structure 120 is circularly configured and disposed inwardly concentric to the wall structure of the first lateral bearing portion 44 and generally continuous excepting a pair of openings 122, 123 positioned along a fore-aft axis 102 of the base assembly 10. A movable blocking tab 124 is provided in the forward opening 123 allowing movement between positions blocking (FIG. 14) or unblocking (FIG. 15) the opening 123. The latch members 92 include a blocking extension 924 which are positioned radially outwardly and adjacent to the blocking structure when the seat shell 30 is attached to the base assembly 10. The blocking tab 124 prevents unlatching movement of the latch member 92 by blocking inward movement in the direction "A" (FIG. 14) when in the blocking position. When the blocking structure 124 is moved to the unblocking position, the blocking extension 924 may freely pass through the foremost opening 123 in the blocking structure 120 so that the latch member 92 may disengage the first retainer 42. The fore-aft positioning of the openings 122, 123 coincides with the position of the latch members 92 when the seat shell 30 is oriented in either side-facing configuration. It also aligns the latch members with the guide structures 425 which have an inner circumference greater than that of the first retainer 42 to reduce the displacement of the latch members 92 necessary to disengage the seat shell. The interlocking relationship of the latch members allows blocking of either latch member to prevent inward (unlatching) movement of either.

An unlatching actuator 126 is operably connected to the blocking tab 124. The blocking tab 124 is biased toward the blocked position; depressing the unlatching actuator 126 moved the blocking tab to the unblocking position. A ratcheting actuator 128 is provided to retain the unlatching actuator in the depressed position. Without operating the ratcheting actuator 128, a user must depress and hold the unlatching actuator 126 in order to detach the seat shell from the base assembly. A cam 98 is provided on the seat shell and configured to align with and depress the ratchet actuator only when the seat shell is properly aligned for detachment.

Figure 32:
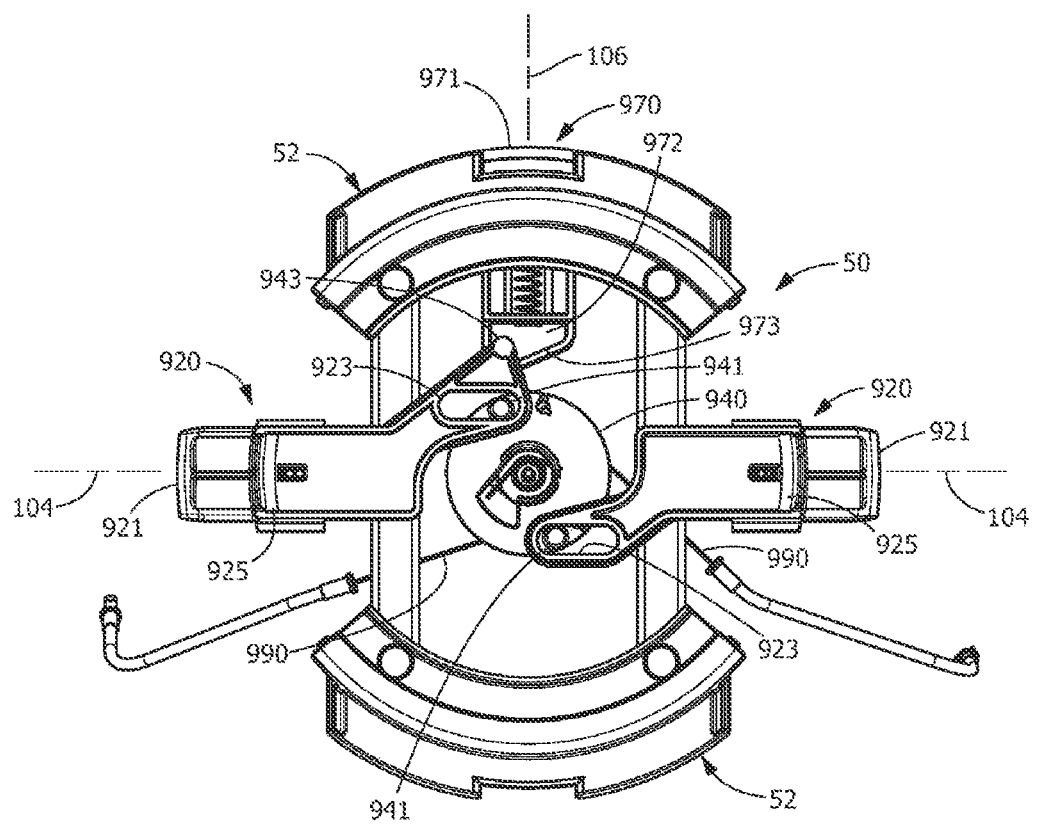
FIG. 32 is a partial view of the latching machoism of FIG. 31 shown from an opposite vantage.

A second embodiment of a latching mechanism 900 for securing connector 20 is illustrated in FIGS. 29 through 32. A pair of moveable latch members 920 are disposed in the second interface portion 50 of the seat shell 30. Movement of the latch members 920 is coordinated for simultaneous releasing movement by inward displacement of the distal ends 921 along a latching axis 104. Inward displacement of latch members 920 is caused by link member 940 which is pivotally connected to the second interface portion 50. Link member 940 includes a pair of driving structures 941, each of which engages a slot-like opening 923 on the respective latch members 920. Driving structures 941 and the openings 923 are configured so that rotation of link member in the releasing direction (clockwise as illustrated in FIG. 32) causes contact between respective openings 923 and driving structures 941 and moves the distal ends 921 of the latching members 920 inwardly. Simultaneous inward movement of the latch members toward a release position may be caused by selective user operation of one or both latch release handles 38 conveniently disposed on the seat shell and operably connected to the link member 940 by pull cable 990 or a similar releasing actuator operably connected to link member 940 to cause rotation. Each latching member includes a resilient member 927 acting against the second interface portion 50 to bias the latching members 920 outwardly so that when releasing action on the link member 940 is removed, the latching members 920 will be urged toward their outward, extended positions. Outward movement of the latching members may be limited by contact with the first lateral guide 44; only when the latching members 920 are aligned with locking recesses 46 may be latching members extend outwardly fully and allow the seat shell to be fixed in a rotational orientation. The locking recesses positions on the first lateral guide and the orientation of latching axis 104 are configured to coincide with forward or rearward-facing orientations of the seat shell on the base assembly.

Inward movement of latch members 920 inwardly may also be caused by contact with guide structures 425 as the seat shell is lowered into engagement with the base assembly. The slot-like openings 923 in the latch members allow their inward displacement without causing or requiring movement of the link member. Once the seat shell is in an operable position and the first and second interface portions of the connector fully engaged, the latch members are urged outwardly by the biasing force applied by resilient members 927.

Latching mechanism 900 further comprises a stabilizer member 970 which is bi-directionally moveably disposed in second interface portion 50 and generally aligned with one of the second retainers 52. The stabilizer member is preferably aligned on a stabilizer axis 106 extending radially from the rotational axis 100, generally perpendicular to latching axis 104, and moveable between generally opposing extended and retracted positions. The latching members 920 and stabilizer member 970 are preferably generally coplanar to enable simultaneous interaction between the latching member distal ends 921 and the stabilizing member distal end 971 with structures on the base assembly as the seat shell is moved into or out of engagement with the base assembly. A resilient element 977 is provided to urge the latching member outwardly toward the extended position.

Inward, retracting movement of the stabilizer member may be caused as the latching members are selectively moved toward the retracted (releasing) positions by operation of one or both of the release handles 38 acting on the linking member 940. One of the latching members 920 further includes a driving structure 943 which moves within an opening 972 in the inward proximal end of the latching member. The opening 972 includes an angled driving surface 973 which interacts with the driving structure 943 on the latching member 920 as the latching member is moving inwardly, causing simultaneous inward movement of the stabilizer member 970. The opening 972 is configured to permit independent inward displacement of the stabilizer member even when the latching member is not inwardly displaced so that any of the latching or stabilizer members may be inwardly displaced without requiring synchronous movement of the remaining members.

The stabilizer member 970 stabilizing axis 106 preferably extends toward the front of the seat shell. Latching mechanism 900 may include a second stabilizing member (not shown) diametrically opposed to stabilizing member 970.

The two-step releasing procedure previously described may also be implemented in the second embodiment of the latching mechanism 900. The latching members 920 may include blocking extension 925 to interact with the which are positioned radially outwardly and adjacent to the blocking structure 120 when the seat shell 30 is attached to the base assembly 10 to prevent inadvertent disengagement of the latching mechanism unless the blocking structure has been released as previously described.

Base assembly 10 may include a pair of stabilizer structures 427 which are positioned to be engageable by the stabilizer member 970 when the seat shell is rotated to either of the side-facing orientations. The interface between the stabilizer member and the stabilizer structure when the stabilizer is in the extended position inhibits rocking of the seat shell relative to the base assembly that may occur as the first and second retainers 42, 52 are aligned for seat shell separation when the second retainers 52 are no longer engaged in the base channel 43. When so engaged, the stabilizer member also inhibits upward movement of the seat shell in a manner similar to the motion restraint provided by the latching members. Repositioning the latching mechanism by operation of the latch release handle 38 and rotation of link member 940 retracts the stabilizer member 970 (as well as the latching members 920) which allows the seat shell to be lifted vertically along the rotational axis 100 and separated from the base assembly.

Indicator flags 132 may be disposed on the base assembly where they are easily viewed by a user. Alignment of the seat shell 30 in either the forward-facing or rearward-facing orientation positions the latch members 92, 920 along transverse axis 103 and aligns them with locking recesses 46. Inwardly biased position sensors 134 are located in each of the locking recesses 46. Contact with the sensors 134 by the latching members 92, 920 as they engage the locking recess displaces the position sensors 134 and causes the indicator flags to change state. Colors such as red or green or wording such as safe or unsafe may be displayed on the indicator flag indicating the state of the seat. As the safety seat is rated for occupancy in the forward- or rear-facing orientations, alignment of the seat shell in either of these orientations changes the state of the indicator flags 13 to indicate that the seat is correctly oriented for use.

Figure 16:
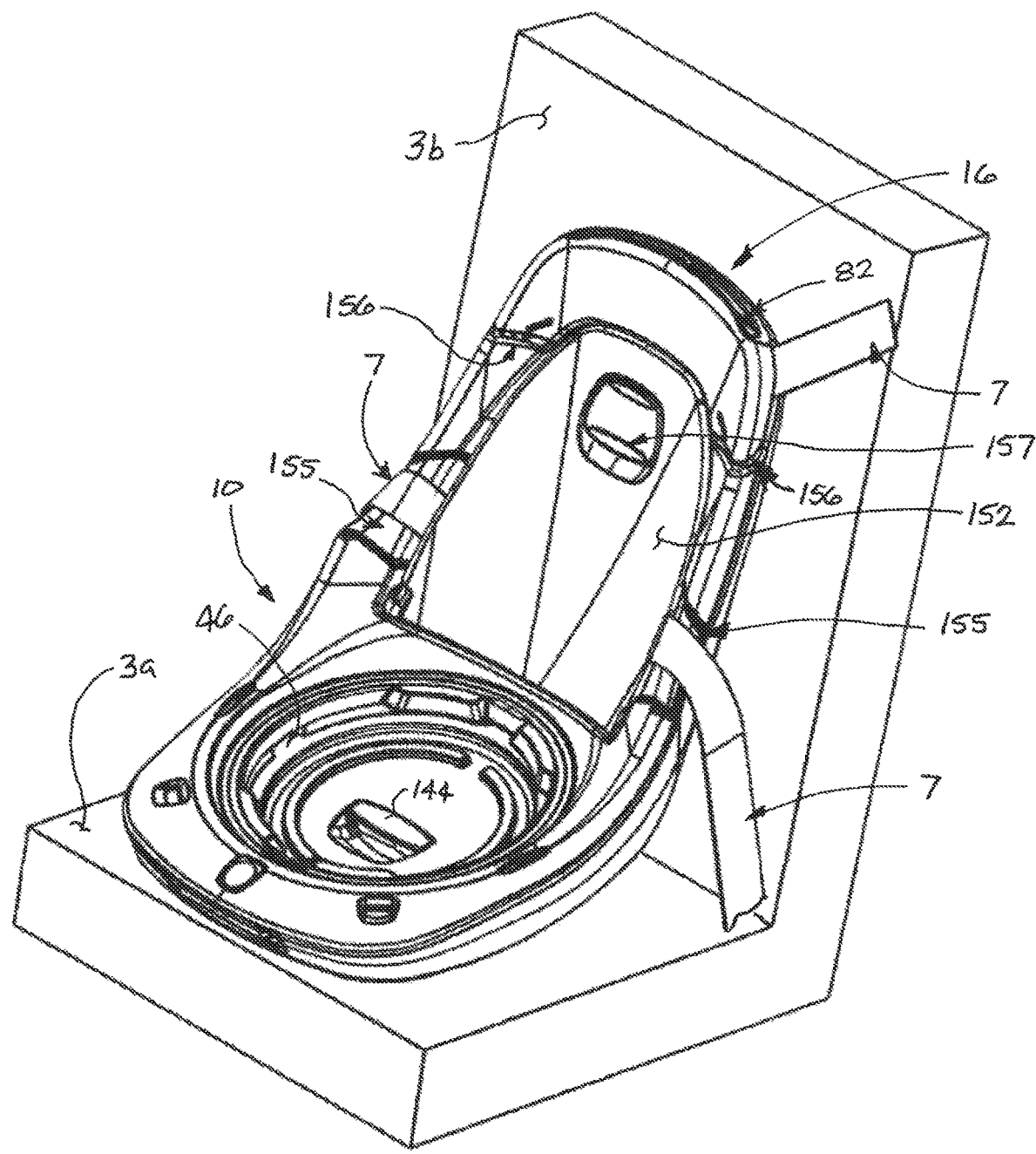
FIGS. 16 and 17 illustrate the base assembly features for securing the safety seat to the vehicle.
Figure 17:
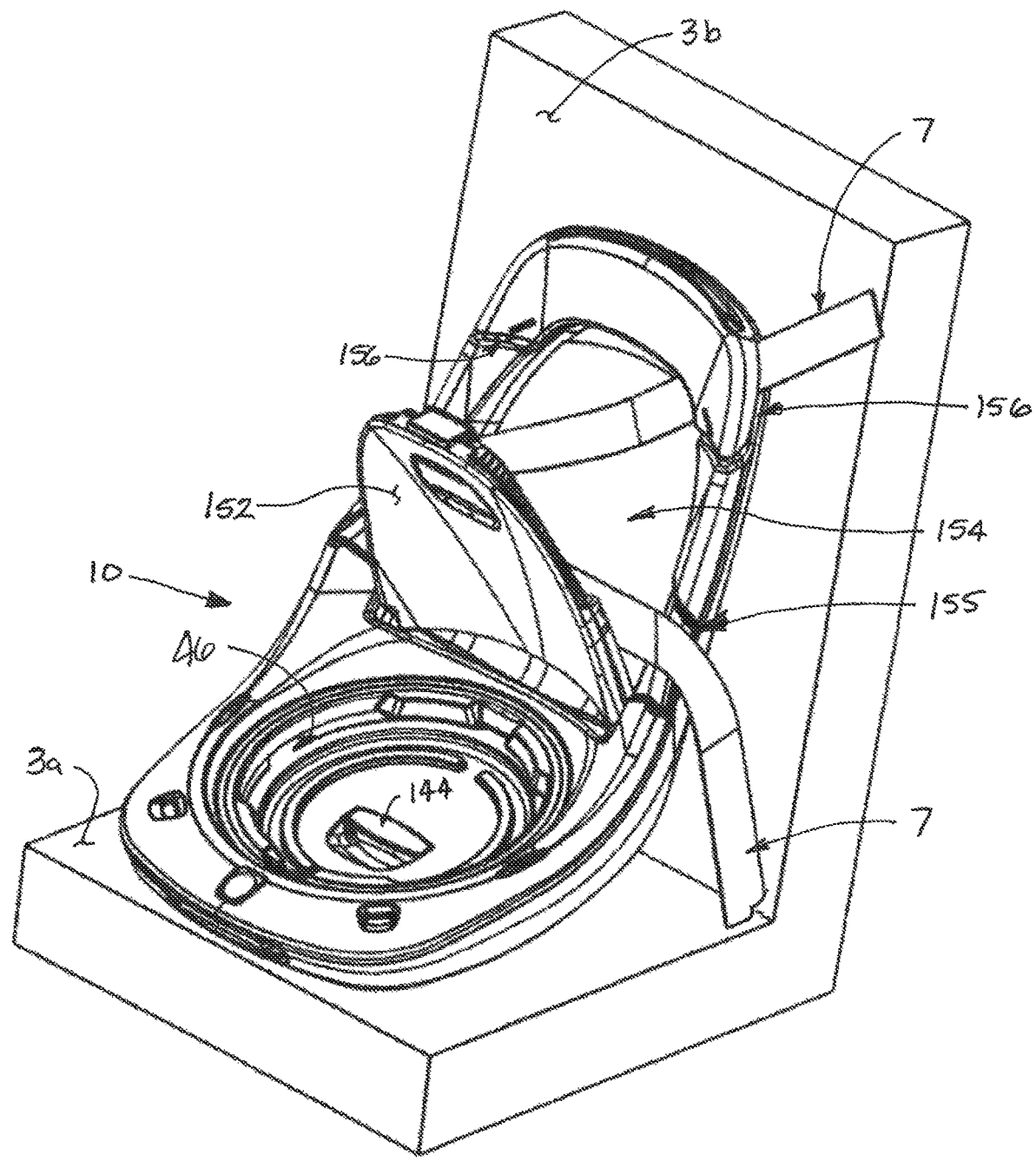
Figure 18:
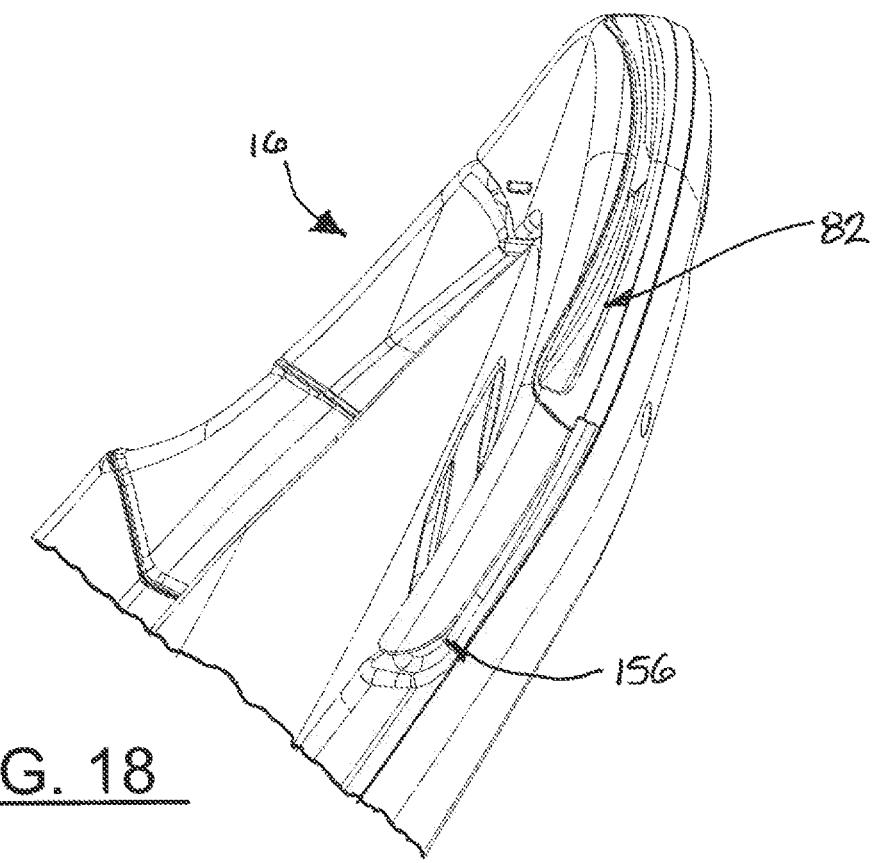
FIGS. 18 through 20 illustrate seat back structural reinforcement between the seat shell and the base assembly backrest that reinforces occupant harness anchoring when the seat is oriented forward-facing.
Figure 19:
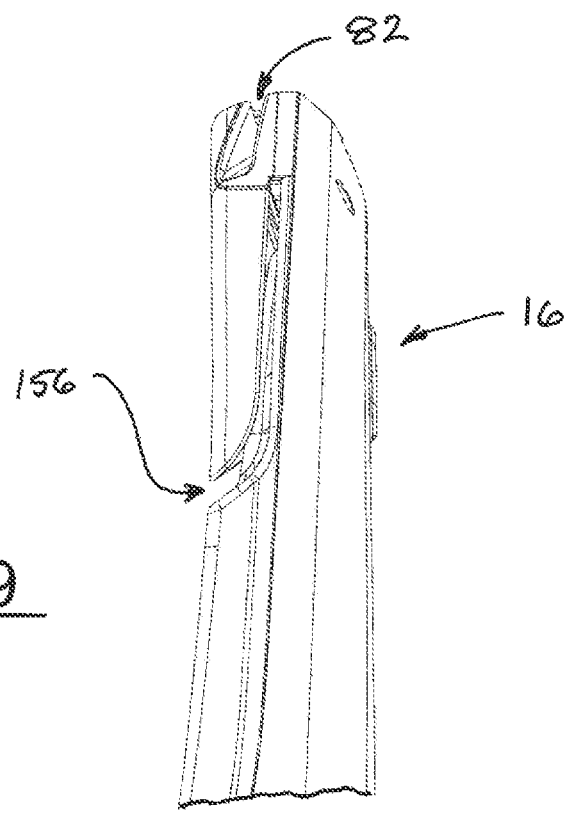
Figure 20:
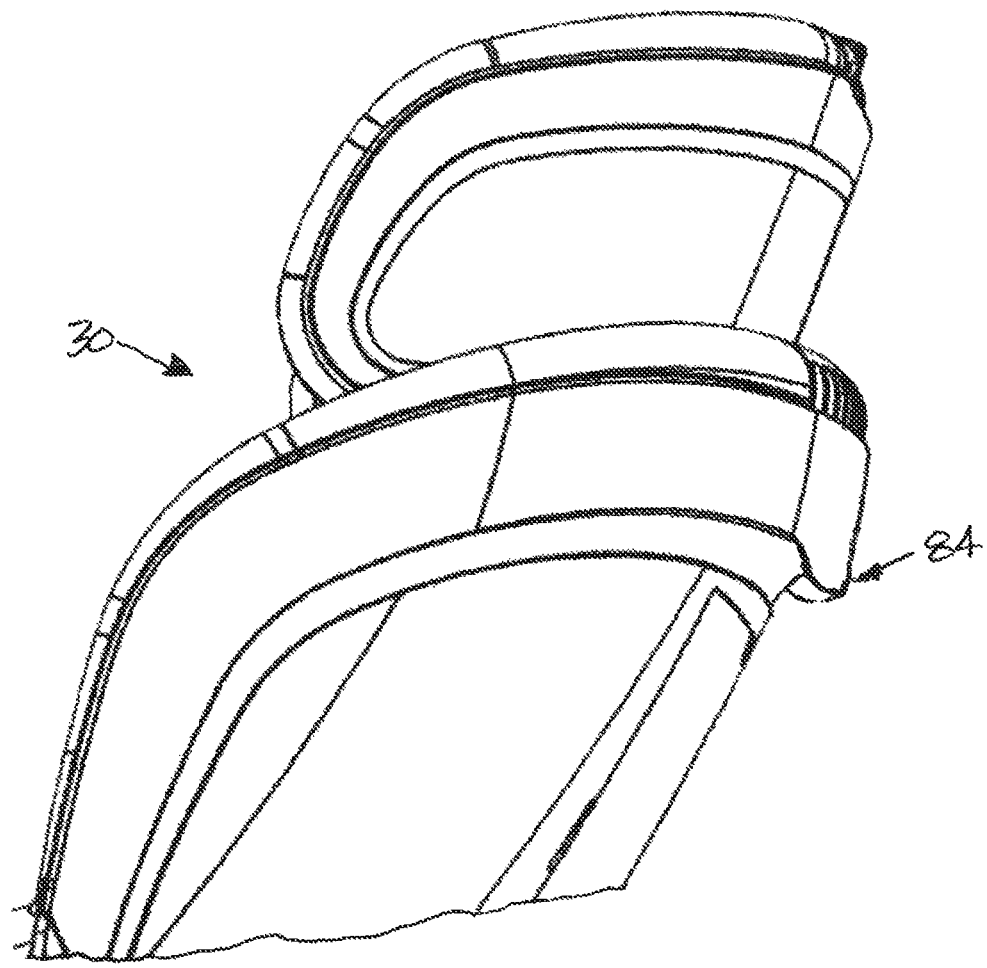

The base assembly 10 may be secured to the vehicle using the vehicle's conventional shoulder-lap (3-point) restraint that is engaged by the base assembly to retain the base assembly in a substantially fixed position in the vehicle seat. The base assembly 10 is provided with a back panel 152 which is disposed on the backrest portion 16 and moveable between a restraining position (FIG. 16) and a releasing position (FIG. 17). Moving the back panel 152 to the releasing position provides access to an interior cavity 154 of the backrest portion 16 through which the lap and shoulder portions of the vehicle safety belt 7 may pass. The lap belt portion engages lower guides 155 as it passes across the backrest portion 16, the guides being configured to maintain a desired position of the lap belt in relation to the base assembly 10. The shoulder belt portion is restrained by an upper guide 156. An upper guide 156 is provided on each side of the backrest portion 16 to allow the base assembly to be installed on either side of the vehicle. When the belt 7 is positioned in the upper and lower guides and tensioned using the conventional means present in the vehicle, moving the back panel 152 to the restraining position pushes the belt into the interior cavity 154, convoluting the belt 7 adjacent to the periphery of the back panel to further reduce slack in the belt and assure a secure attachment of the base assembly 10 to the vehicle. A releasing actuator 157 is provided to enable selective release of the back panel and removal of the base assembly from the vehicle.

The back panel 152 also prevents entanglement of the safety belt 7 by the seat shell 30 as it moves/swivels on the base. The safety belt 7 remains generally hidden from view of the infant when the seat shell is oriented rear-facing and thus does not pose a risk that the infant's feet could become entangled in the belt.

Securing the backrest portion 16 of the base assembly 10 to the vehicle allows the backrest surface 32b of the seat shell 30 to be structurally anchored to the vehicle thereby increasing the capability of the seat. A capture means comprising a reinforced receiving slot 82 provided in the top of the backrest portion 16 is configured to receive a reinforced tongue 84 provided on the exterior of the seat shell 30 proximate the distal end of the backrest surface. The reinforced tongue 84 is integral to the seat shell and rotates therewith. As the seat shell is rotated into the forward-facing orientation, the tongue 84 engages the receiving slot 82, structurally linking the backrest portion 16 and the upper back portion of the seat shell 30. The configuration of the receiving slot 82 provides other utility such as the connection of a mounting bracket, such as would be useful for mounting a mirror to allow a caregiver operating the vehicle to view the infant occupant when the seat shell is in the rear-facing orientation. Other useful features may also be provided for attachment to the safety seat using the receiving slot within the scope of the invention.

Figure 21:
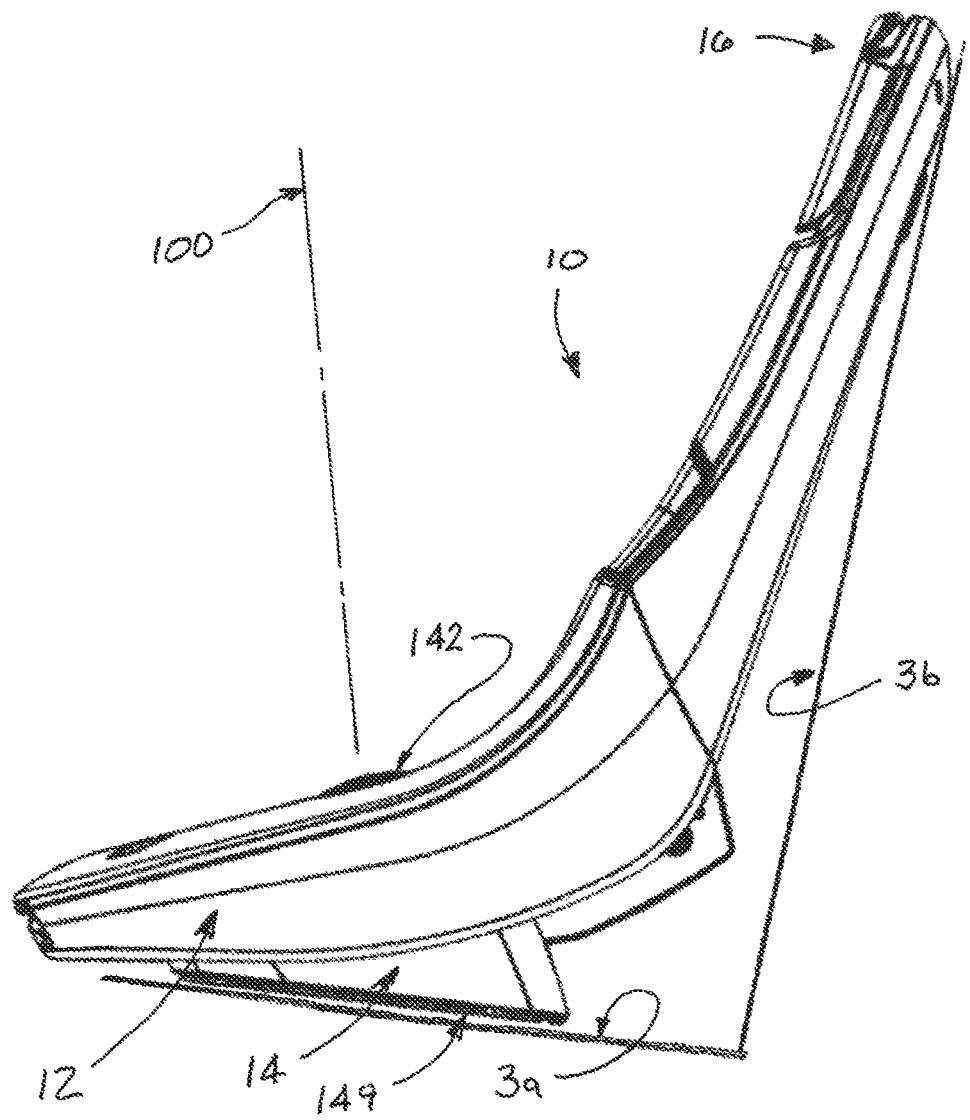
FIGS. 21 and 22 illustrate the base assembly inclination adjustment feature.
Figure 22:
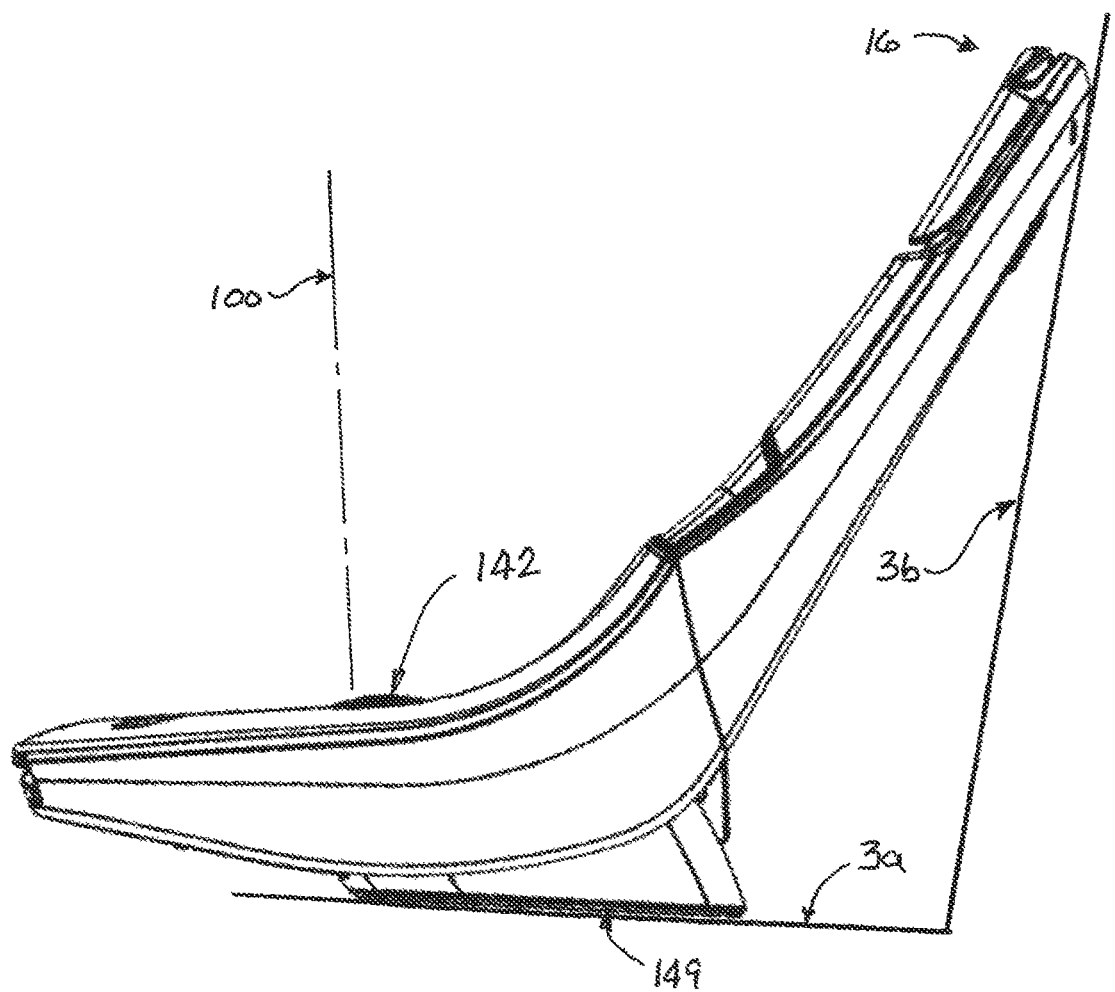

Referring to FIGS. 13 and 21-22, the base assembly 10 further includes a wedge adjuster 14 disposed on the base portion 12 which allows the base assembly 10 to be configured to securely fit into a variety of vehicle seats of different inclinations of the seating surface 3a to assure simultaneous adjacent contact by the base assembly 10 with both the seating surface 3a and the backrest surface 3b and ideal positioning of the base assembly. Typical vehicle rear seat surfaces are angled in a range of 2 degrees to 17 degrees rearward. The preferred orientation of the base assembly positions the rotational axis 100 approximately 4 degrees forward tilt from vertical. Wedge adjuster 14 is moveably connected to the base assembly 10 by a curved track including a positioning rack and a follower. Movement ranges between a maximum inclination (FIG. 21) to a minimum inclination (FIG. 22) encompassing approximately 15 degrees of inclination change between the two positions. A positioning actuator 144 located on the floor surface 45 of the base assembly allows selective disengagement of the follower mechanism from the positioning rack which in turn allows the wedge adjuster 14 to move along the curved track thereby changing the angle of its bottom surface 149 with respect to the base assembly 10. Once positioned, the user releases the actuator 144 to lock the wedge adjuster in a fixed position. Inclination indicators 142 may be provided on the base assembly to assist the use in properly orienting the base assembly 10 for installation on the vehicle seat. Other mechanisms may be easily incorporated to moveably connect the wedge adjuster to the base assembly in a manner accomplishing the same objective.

Figure 23:
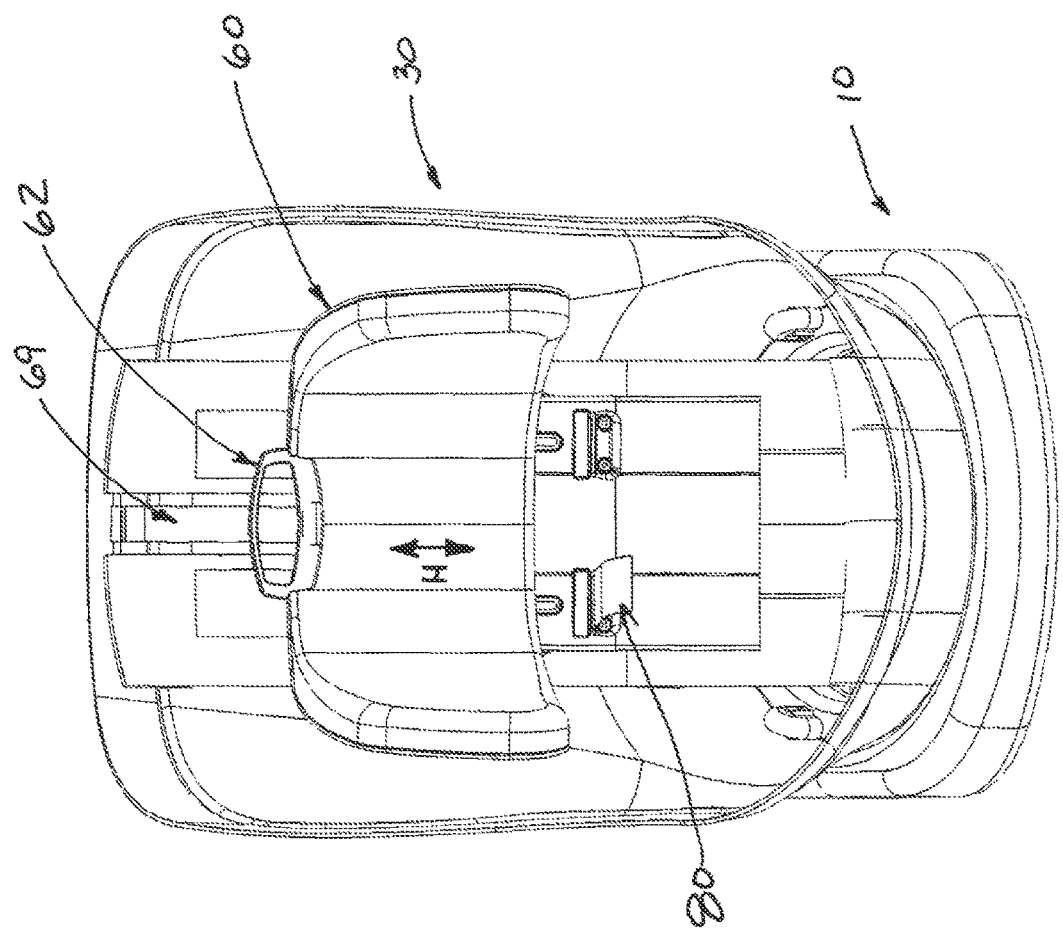
FIG. 23 is a view of the interior space of the seat shell illustrating a headrest adjustment provision.
Figure 24:
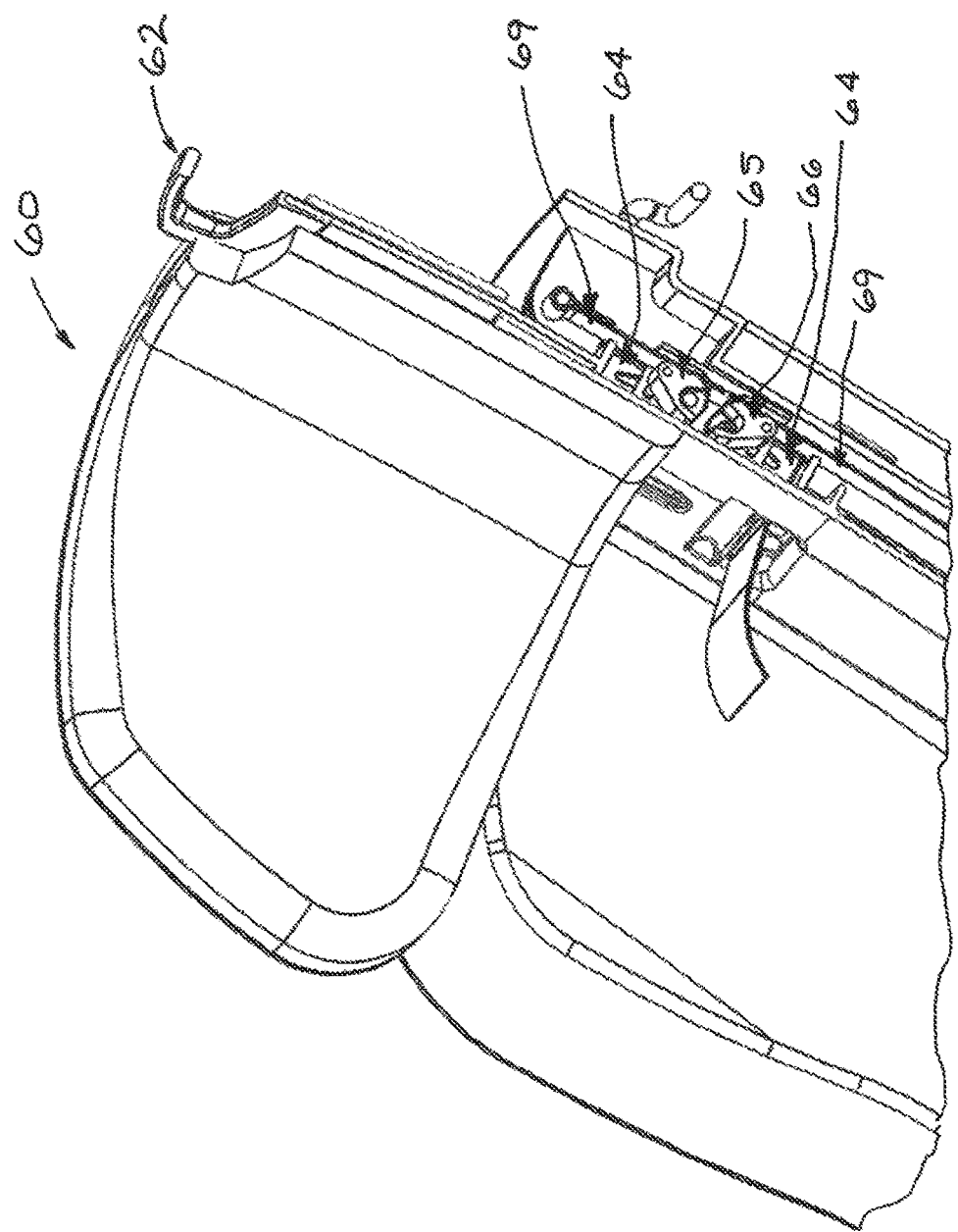
FIGS. 24 through 26 provide a partial cutaway view of the mechanism for fixing the adjustable headrest into position.

Referring now to FIGS. 23 through 26, the seat shell 30 may further comprise a head restraint 60 that is vertically moveable generally along the plane of the backrest portion 16, indicated by directional arrow "H" in FIG. 23. A headrest release mechanism may comprise a release handle 62 operably connected to an actuator cam 64 which adjusts the position of a pair of cam-locks 65, 66 which are engageable against a fixed anchor strap 69 disposed in the backrest portion 16. The cam-locks 65, 66 are oriented so that they are self-energized in opposite directions. The release actuator cam 64 is configured so that linear movement of the release handle in either direction from a neutral (engaged) position displaces the cam-locks 65, 66 from engagement with the anchor strap webbing and allows movement of the headrest.

Figure 25:
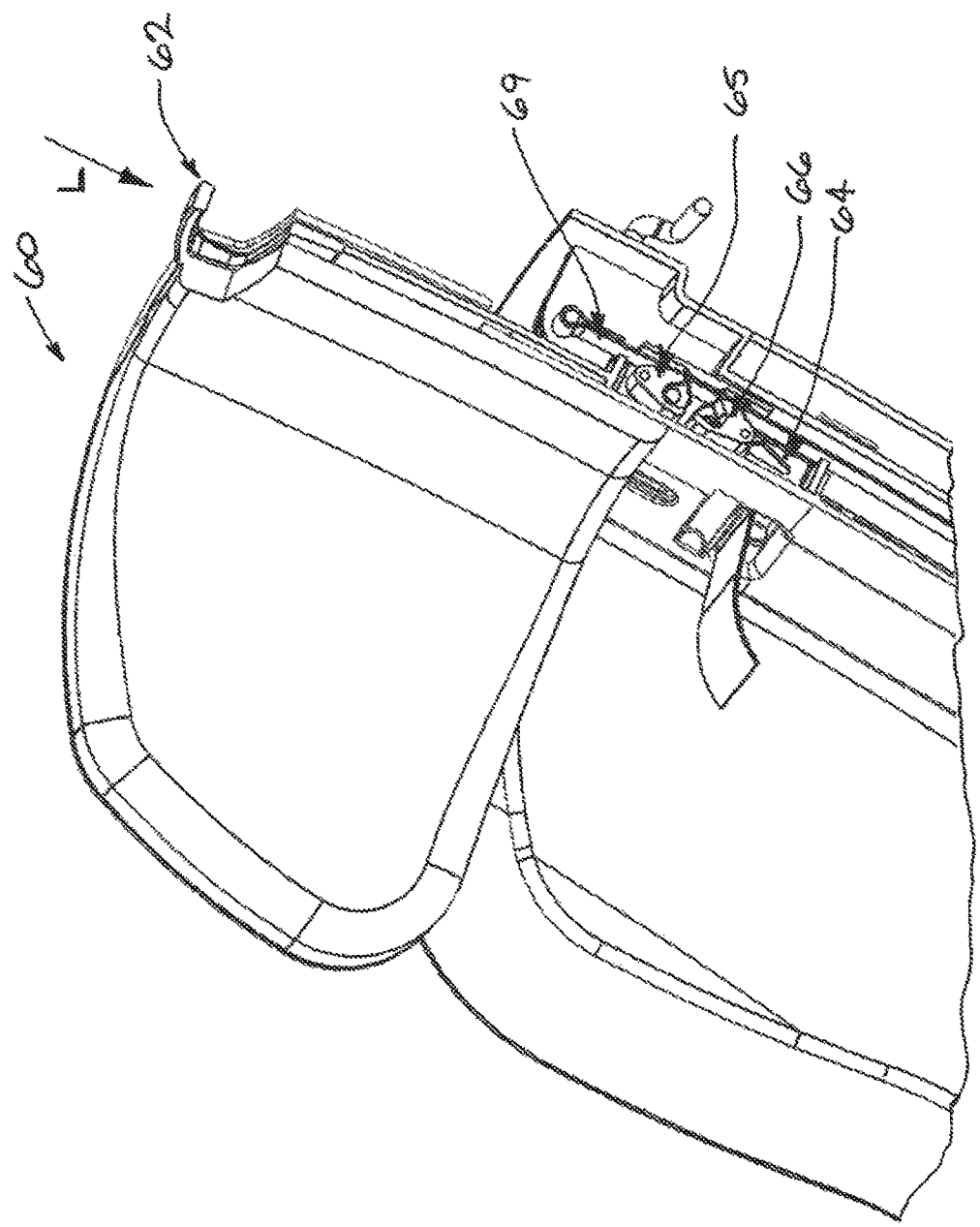
Figure 26:
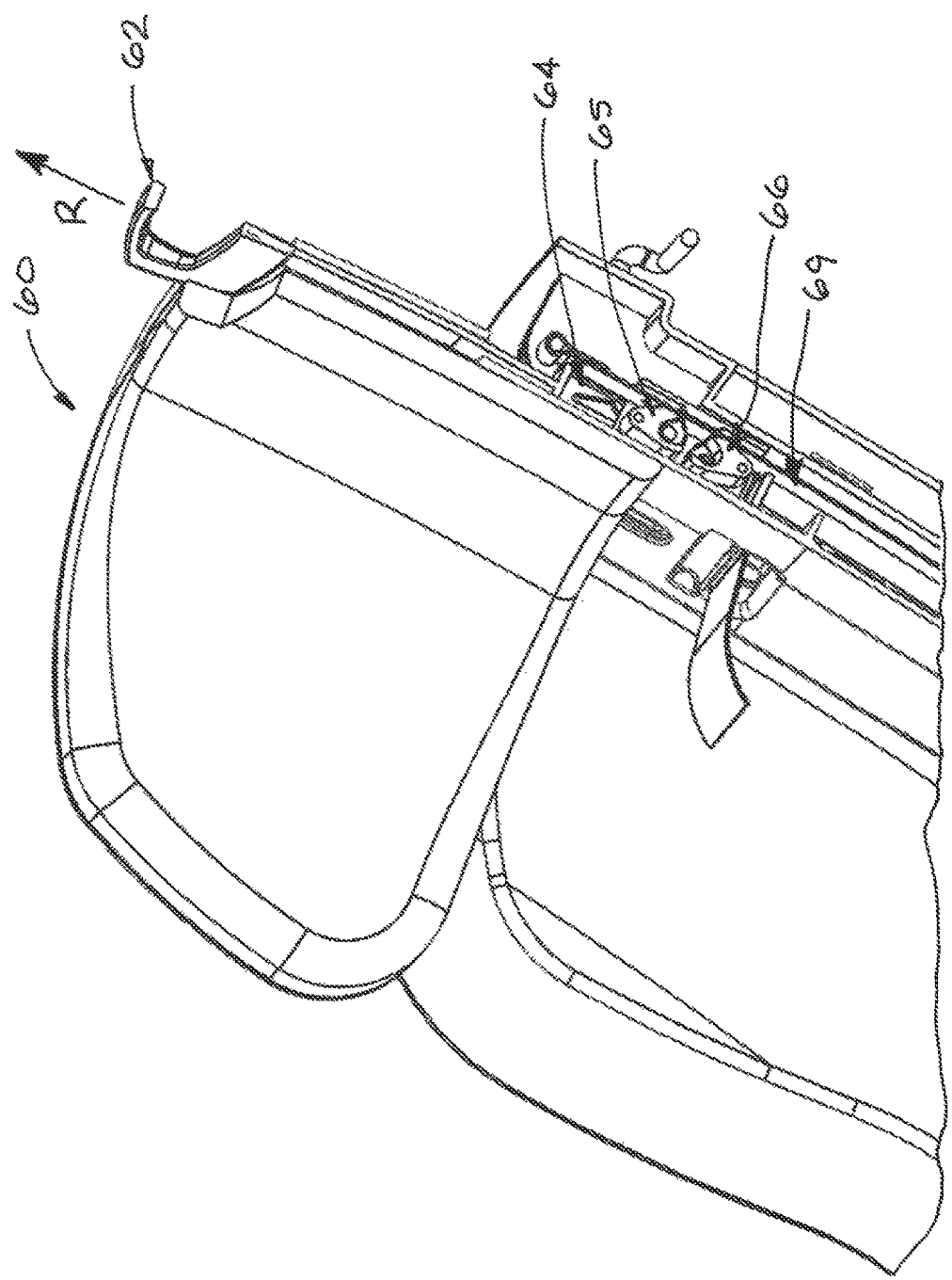

The release mechanism is further operable to allow headrest adjustment by pushing or pulling an actuator from a neutral position. In this way, the desired direction of movement of the headrest (raising or lowering) may coincide with the direction the release handle 62 is moved to enable headrest movement making headrest adjustment more intuitive. This is best illustrated in in FIGS. 25 and 26. In FIG. 25, the release handle 62 has been moved down, indicated by directional arrow "L", typical when the use wants to lower the head restraint 60. In FIG. 26, handle 62 has been raised, indicated by direction arrow "R", as would be typical for a user wanting to raise the head restraint 60.

The release mechanism is further configured to be low profile so that the "thickness" of the seat shell 30 back in which the adjusting mechanism is disposed may be maintained sufficiently thin to maintain the position of the seat shell sufficiently close to the vehicle seat back to minimize head and/or knee excursions during accidents and keep them within prescribed limits.

The adjustable head restraint 60 may also include a harness adjuster means 70 to provide desired slack in the infant harness belts 80 for convenience when securing infants in the seat while also accommodating a wider range of occupant sizes afforded by the adjustable headrest. The backrest surface 32b includes a guide track 72 for a moveable harness anchor member 74. The guide track 72 limits movement of the anchor member to bi-directional along an axis generally aligned with the plane of the seat back and limits the extent of the anchor member movement. The harness belts 80 are routed from beneath the interior space 32 of the seat and extend along the backrest portion to a pair of guides 76 disposed on the anchor member 74. The harness belts 80 are wrapped around the guides 76 and turned 180 degrees and directed back down along the seat back, but forward of the initial upward run, before being routed through openings in the headrest into the interior space 32 of the seat. This arrangement applies a downward force on the anchor member that generally maintains the member at the lowest (most downward) position permitted.

Figure 27:
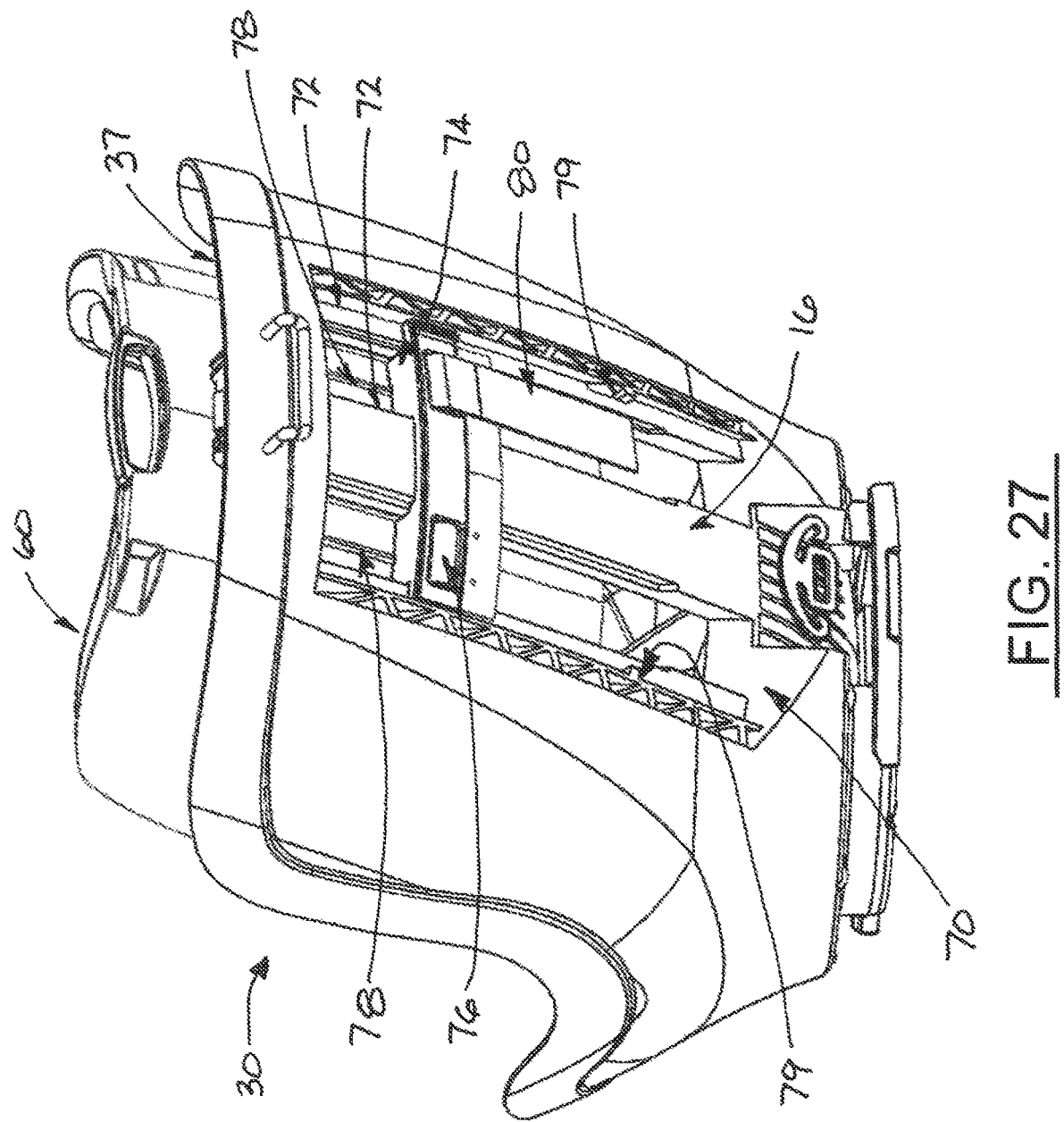
FIGS. 27 and 28 are a partial view of the adjustable headrest in the seat shell and illustrate the features for managing slack length of the occupant harness belts.

Upward-downward movement of the anchor member 74 is synchronized with upward downward movement of the headrest 60. The anchor member 74 includes one or more followers engaging elongate slots 78 on the headrest 60. The slots 78 are aligned generally with the axis of headrest movement. As the headrest 60 moves upwardly (FIG. 27), the followers contact the lowest extent of the slots 78 establishing a minimum belt take-up distance between the guides 76 and the headrest openings for the belt entrance into the shell interior space. Further upward movement of the headrest 60 moves the anchor member 74 upwardly thereby shifting the vertical position of the guides 76 to manage available slack in the harness belts 80 while maintain spacing between guides 76 and the headrest openings for the belt entrance into the shell interior space.

Figure 28:
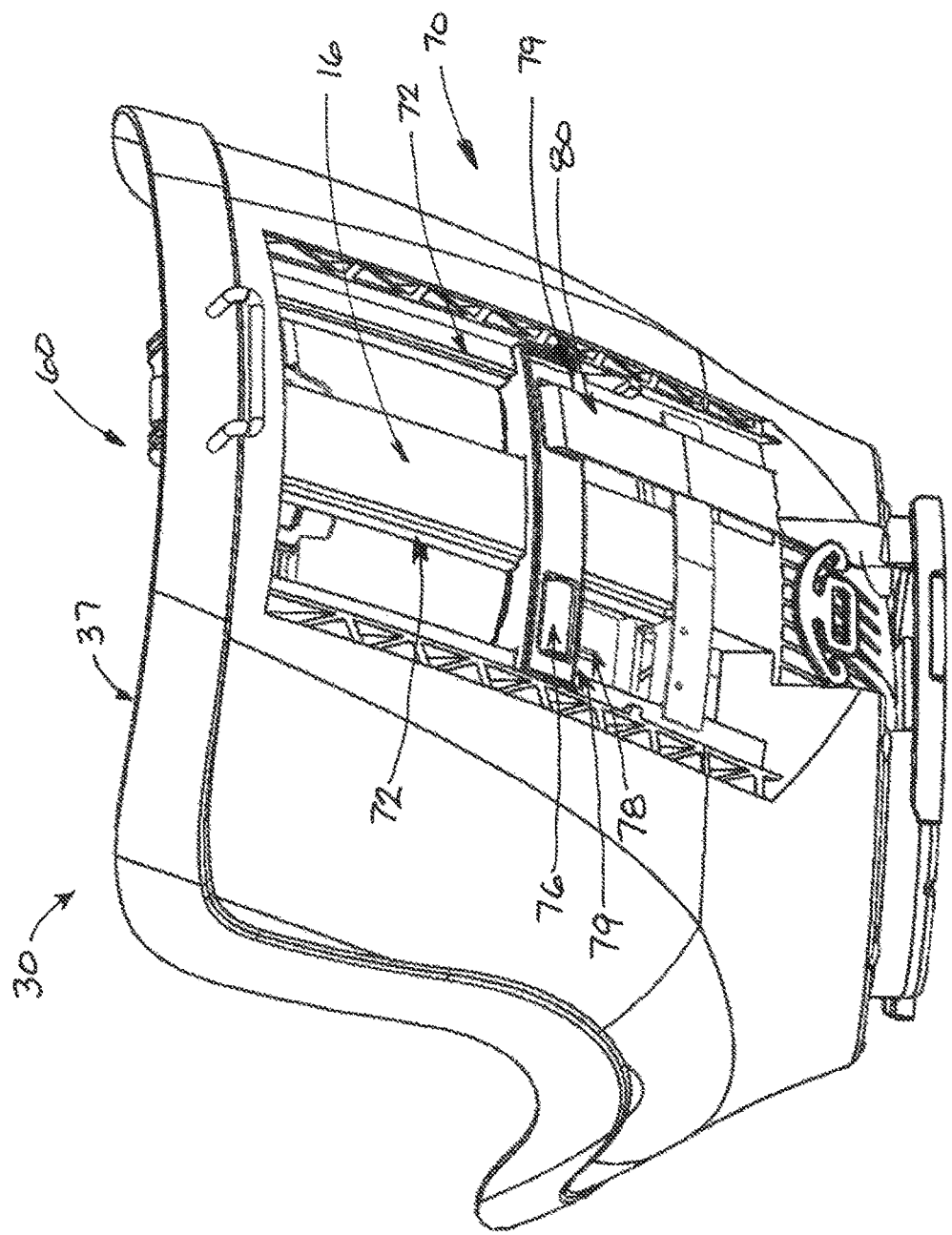
Figure 29:
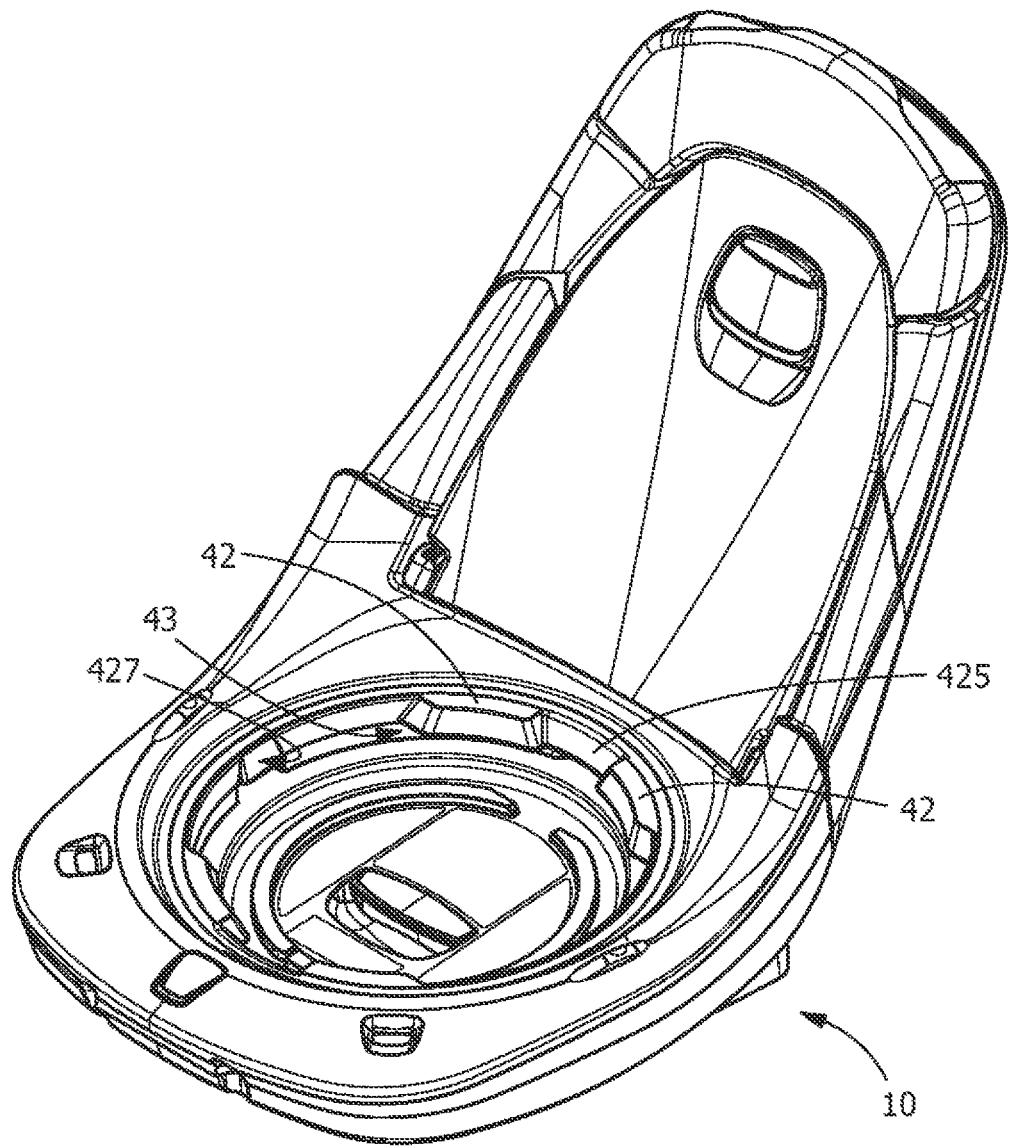
FIG. 29 is a perspective view of a base assembly for the present child safety seat invention illustrating a second embodiment of a seat connection.
Figure 30:
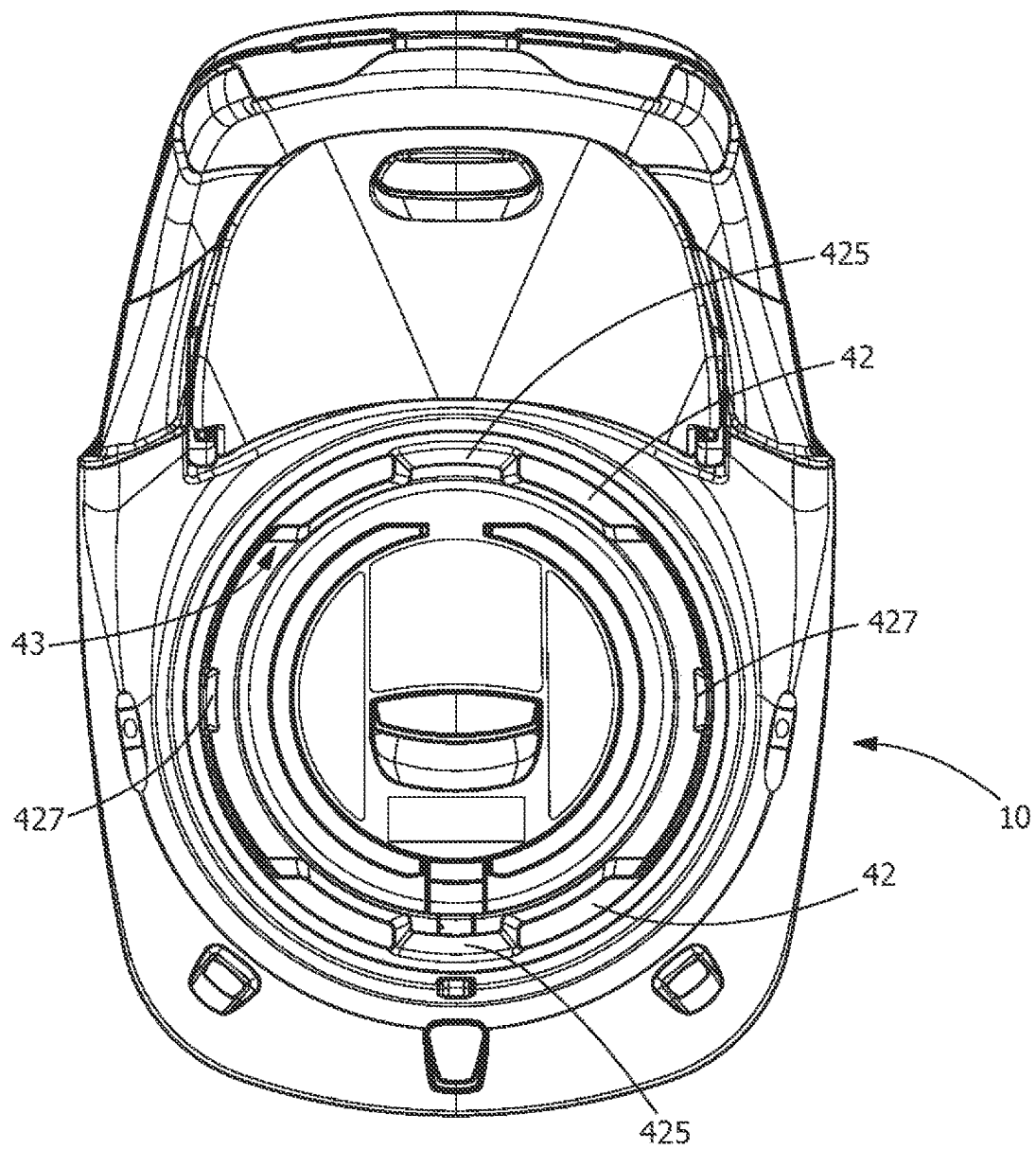
FIG. 30 is a plan view of the base assembly illustrated in FIG. 29.
Figure 31:
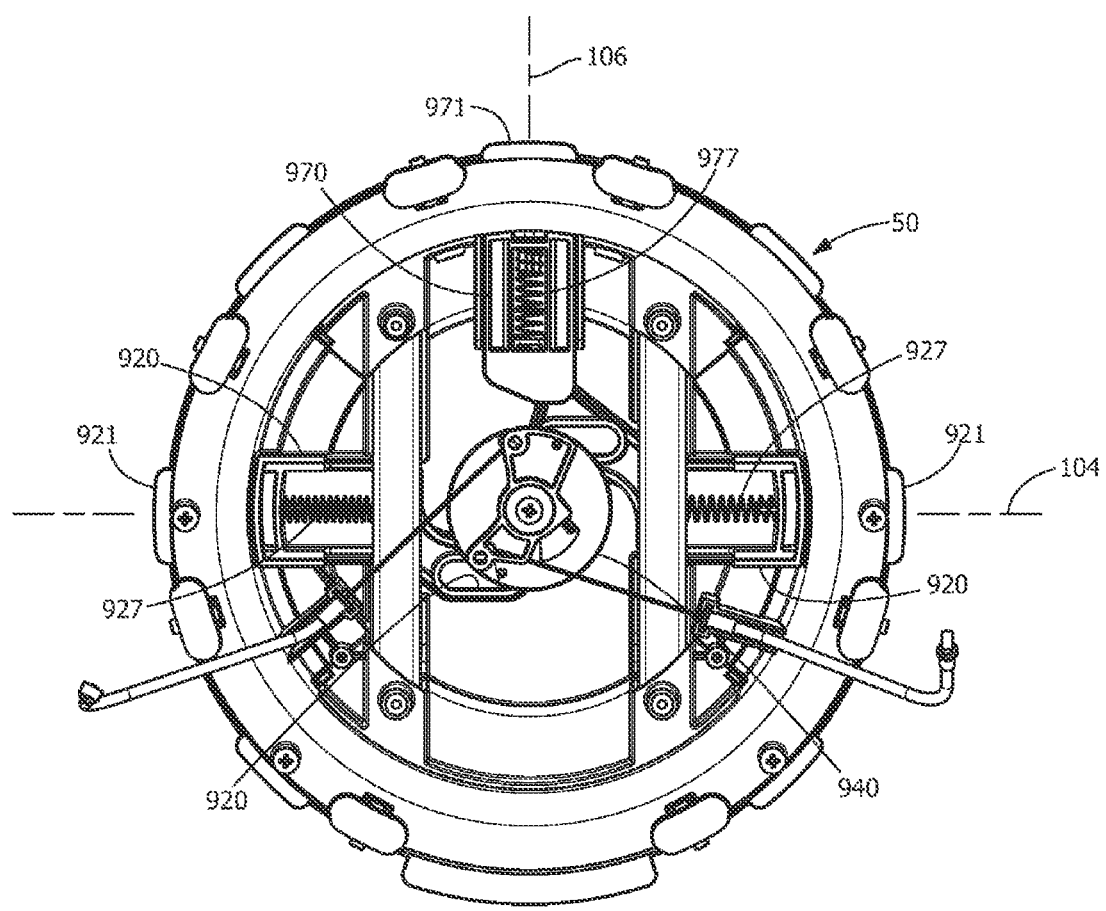
FIG. 31 is a partial plan view of a latching mechanism used in the second embodiment of the seat connection of FIGS. 29 and 30.

As the headrest is moved downwardly (FIG. 28), the anchor member 74 contacts a stop structure 79 positioned in the guide track 72. The stop structure 79 limits the rage of downward movement of the anchor structure 74. As the headrest 60 continues downward movement, the anchor member 74 remains stationary, shifting the followers upward in the slots 78. The slots 78 are configured to allow the headrest 60 to continue moving toward its lowest position after them the anchor member has contacted stop structure 79. This downward movement of the headrest in relation to the anchor member 74 increases the spacing between the guides 76 and the headrest openings for the belt entrance into the shell interior space. This increased spacing thus increases the length of the harness belts 80 within the seat shell structure to manage the slack in the seat shell itself. The benefit is that the harness belt length may be made long enough for convenience when the seat is used by larger occupants while taking in excess slack when the seat is adjusted for use with smaller occupants.

Naturally, the invention is not limited to the foregoing embodiments, but it can also be modified in many ways without departing from the basic concepts. Changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A child safety seat for a vehicle comprising:
    a base structure securable to a seat in a vehicle;
    a seat shell having an interior portion configured to receive a child occupant and an exterior portion; and
    a connector configured to selectively connect the seat shell to the base structure enabling relative rotational movement about a generally upstanding rotational axis, the connector further comprising:
        a first connector interface disposed on the base structure with a generally C-shaped, inwardly open channel extending partially around a circular periphery, the C-shaped channel having a first and a second gap sector diametrically opposed on the periphery, the C-shaped channel encircling an upwardly open receiving area;
        a second connector interface disposed on the seat shell configured for engagement with the receiving area of the first connector interface, the second connector interface having first and second flange portions fixedly extending generally outwardly from a central portion of the second connector interface and diametrically opposed along a flange axis radially aligned to the rotational axis, the flanges configured to engage the C-shaped channel when the seat shell is operably engaged with the base to enable rotation of the seat shell about an upstanding rotational axis and prevent separation of the seat shell from the base assembly by inhibiting movement of the first and second flanges along the rotational axis except when the first and second flange portions are rotationally aligned with the first and second gap sectors, such rotational positioning enabling separation of the seat shell from the base structure by movement of the seat shell axially along the rotational axis; and
    a latching mechanism having first and second latching members bi-directionally moveable on a latching axis between opposing extended and retracted positions, the latching axis being aligned radially to the rotational axis and non-aligned with the flange axis, the latching members engaging the C-shaped channel when the first and second flange portions are rotationally aligned with the first and second gap sectors and the latching members are in the extended position, each latching member having a resilient member biasing the member toward the engaged position.

2. The safety seat of claim 1, further comprising a releasing actuator with a link member operably coupled to move the first and second latching members,
    the releasing actuator having a normal position and a released position, the releasing actuator configured to move the first and second latching members from the extended position to the retracted position by movement from the normal position to the released position, and to permit movement of the first and second latching members from the extended position to the retracted position while in the normal position.

3. The safety seat of claim 1, wherein the seat shell is rotatable into at least a forward-facing orientation, a rearward-facing orientation, and a side-facing orientation, the first and second flange portions being rotationally aligned with the first and second gap sectors when the seat shell is in the side-facing orientation.

4. The safety seat of claim 3, wherein the first flange portion further comprises a stabilizer member bi-directionally moveable between opposing extended and retracted positions and a resilient member biasing the stabilizer member toward the extended position, the stabilizer member operably connected and moveable by the first latching member toward the retracted position as the first latching member moves toward the retracted position, and the first connector interface further comprises first and second stabilizer structures disposed in the in first and second gap sectors, respectively, one of the stabilizer structured engageable by the stabilizer member when the stabilizer member is extended and the first and second flange portions are rotationally aligned with the first and second gap sectors thereby inhibiting movement of the seat shell along the rotational axis, retraction of the stabilizer member enabling movement of the seat shell along the rotational axis to separate the seat shell from the base assembly.

5. The safety seat of claim 4, wherein the C-shaped channel has at least one locking recess engageable by one or more of the locking members, engagement thereof preventing seat shell rotation.

6. The safety seat of claim 5, wherein the at least one locking recess is configured to restrain the seat shell in one of at least the forward-facing and rearward-facing positions.

7. The safety seat of claim 3, wherein the base structure further comprises an interlock barrier extending partially into the receiving area, the interlock barrier blocking movement of the first and second latch members toward the retracted position unless the first and second flange portions are rotationally aligned with the first and second gap sectors.

8. The safety seat of claim 7, wherein the interlock barrier further comprises a blocking tab moveable between a blocking position in which it aligns with the interlock barrier and an unblocking position in which it is displaced into the base assembly creating a gap in the interlock barrier, the blocking tab inhibiting inward movement of one of the first or second latch members to the releasing position when the first and second flange portions are rotationally aligned with the first and second gap sectors and the blocking tab is in the blocking position, and enabling inward movement of one of the first or second latch members to the releasing position when in the unblocking position.

9. A connector for removeably attaching a child safety seat shell to a base structure secured to a vehicle seat comprising:
 a first connector interface disposed on the base structure with a generally C-shaped, inwardly open channel extending partially around a circular periphery, the C-shaped channel having a first and a second gap sector diametrically opposed on the periphery, the C-shaped channel encircling an upwardly open receiving area;
 a second connector interface disposed on the seat shell configured for engagement with the receiving area of the first connector interface, the second connector interface having first and second flange portions fixedly extending generally outwardly from a central portion of the second connector interface and diametrically opposed along a flange axis radially aligned to the rotational axis, the flanges configured to engage the C-shaped channel when the first and second connector interfaces are operably engaged to enable relative rotation about a rotational axis, the first and second flange portions being configured to enable separation of the seat shell from the base assembly by movement of the second connector interface axially along the rotational axis only when the connector is rotationally positioned in a separation orientation wherein the first and second flange portions are rotationally aligned with the first and second gap sectors, engagement of the first and second flange portions with the C-shaped channel of the first connector interface preventing separation of the seat shell from the base assembly by inhibiting movement of the first and second flanges along the rotational axis and permitting only rotational movement of the second connector interface when the connector is not rotationally positioned in the separation orientation;
 a latching mechanism having first and second latching members bi-directionally moveable on a latching axis between opposing extended and retracted positions, the latching axis being aligned radially to the rotational axis and non-aligned with the flange axis, the latching members engaging the C-shaped channel when the connector interfaces are aligned in the separation orientation and the latching members are in the extended position, each latching member having a resilient member biasing the member toward the engaged position; and
 a releasing actuator disposed on the second interface portion having a normal position and a released position, the releasing actuator configured to move the first and second latching members from the extended position to the retracted position by movement from the normal position to the released position and to permit movement of the first and second latching members from the extended position to the retracted position while in the normal position.

10. The connector of claim 9, wherein the first flange portion further comprises a stabilizer member bi-directionally moveable between opposing extended and retracted positions, and a resilient member biasing the stabilizer member toward the extended position, the stabilizer member operably connected and moveable by the first latching member toward the retracted position as the first latching member moves toward the retracted position.

11. The safety seat of claim 10, wherein at least one locking recess engageable by the latch members is provided, engagement of the locking recess by the latch members preventing relative rotation of the first and second interface portions from a first rotational orientation that is not the separation orientation.

* * * * *